(12) United States Patent
Hung et al.

(10) Patent No.: US 10,104,288 B2
(45) Date of Patent: Oct. 16, 2018

(54) METHOD AND APPARATUS FOR GENERATING PANORAMIC IMAGE WITH STITCHING PROCESS

(71) Applicant: ASPEED Technology Inc., Hsinchu (TW)

(72) Inventors: Pei-Hen Hung, Hsinchu (TW); Chung-Yen Lu, Hsinchu (TW); Kuo-Wei Yeh, Hsinchu (TW); Jing-Chuan Chen, Hsinchu (TW)

(73) Assignee: ASPEED TECHNOLOGY INC., Hsinchu (TW)

( * ) Notice: Subject to any disclaimer, the term of this patent is extended or adjusted under 35 U.S.C. 154(b) by 127 days.

(21) Appl. No.: 15/427,504

(22) Filed: Feb. 8, 2017

(65) Prior Publication Data

US 2018/0227484 A1 Aug. 9, 2018

(51) Int. Cl.
*H04N 5/232* (2006.01)
*G06T 3/40* (2006.01)
*G06T 3/00* (2006.01)
*G06T 11/60* (2006.01)

(52) U.S. Cl.
CPC ....... *H04N 5/23238* (2013.01); *G06T 3/0093* (2013.01); *G06T 3/4007* (2013.01); *G06T 11/60* (2013.01); *G06T 2200/32* (2013.01)

(58) Field of Classification Search
CPC .... H04N 5/23238; G06T 11/60; G06T 3/0093
USPC ........................................................... 348/36
See application file for complete search history.

(56) References Cited

U.S. PATENT DOCUMENTS 9,875,575 B2 * 1/2018 Satkin .................... G06T 17/05

* cited by examiner

*Primary Examiner* — Nam D Pham
(74) *Attorney, Agent, or Firm* — Muncy, Geissler, Olds & Lowe, P.C.

(57) ABSTRACT

A vertex processing device applied in an image processing system having an image capture module is disclosed. The image capture module generates camera images. The vertex processing device comprises a coefficient interpolation unit and a coordinate modifying unit. The coefficient interpolation unit generates an interpolated warping coefficient for each camera image with respect to each vertex from a vertex list based on n number of warping coefficients and its original texture coordinates in each camera image. The coordinate modifying unit calculates modified texture coordinates in each camera image for each vertex according to the interpolated warping coefficient and its original texture coordinates in each camera image. The vertex list comprises vertices with data structures that define vertex mapping between the camera images and a panoramic image. The n number of warping coefficients correspond to n number of overlap regions in the panoramic image.

38 Claims, 24 Drawing Sheets polygon mesh on equirectangular domain

Triangle mesh modeling a sphere

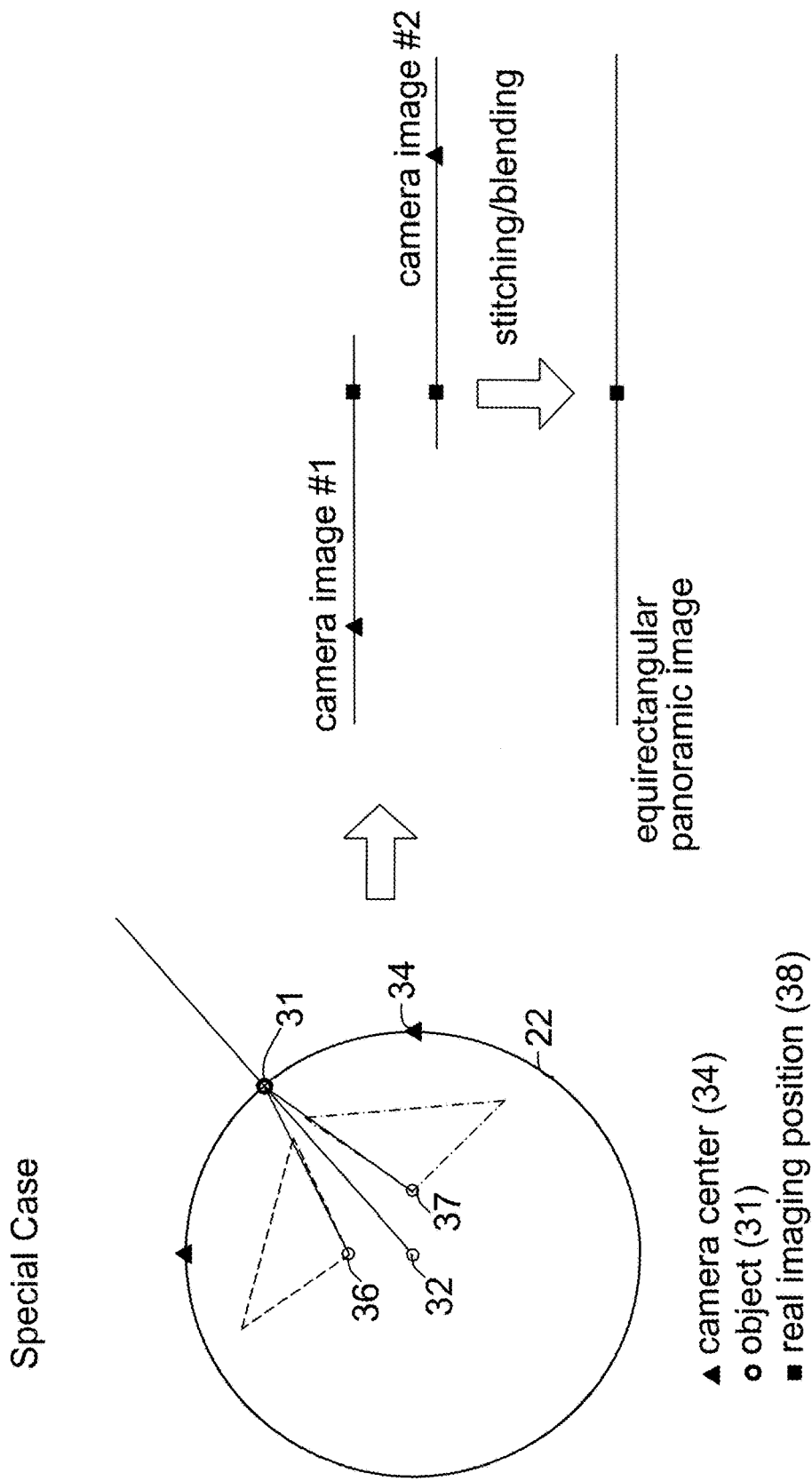

METHOD AND APPARATUS FOR GENERATING PANORAMIC IMAGE WITH STITCHING PROCESS

BACKGROUND OF THE INVENTION

Field of the Invention

The invention relates to panoramic imaging, and more particularly, to a method and apparatus for generating panoramic images with stitching process.

Description of the Related Art 360 degree panoramic images, also known as 360 panoramic images, full panoramic images, or spherical images, are video recordings of a real-world panorama, where the view in every direction is recorded at the same time, shot using an omnidirectional camera or a collection of cameras. A 360 degree panoramic image covers 360 degree field of view (FOV) horizontally and 180 degree vertically.

An equirectangular video is a commonly projection used in 360 video. A common example of equirectangular projection is a standard world map, which maps the surface of the world (a sphere) onto orthogonal coordinates. That is, equirectangular projection maps the latitude and longitude coordinates of a spherical globe directly onto horizontal and vertical coordinates of a grid. Image distortion is minimal at the equator, and infinite at the poles. The poles (Zenith, Nadir) are located at the top and bottom edge and are stretched to the entire width of the image.

FIG. 1 is a diagram showing a conventional panoramic image processing system disclosed in U.S. patent application Ser. No. 15/211,732 (the disclosure of which is incorporated herein by reference in its entirety). Referring to FIG. 1, the panoramic image processing system 10 includes an image capture module 11, an image processing apparatus 13, an image encoding module 12 and a correspondence generator 15. The image capture module 11 including a plurality of cameras is capable of capturing a view with 360 degree horizontal FOV and 180 degree vertical FOV to generate a plurality of camera images. After receiving the camera images from the image capture module 11, the image processing apparatus 13 performs rasterization, texture mapping and blending operations to form a panoramic image according to an original vertex list. Finally, the encode module 12 encodes the panoramic image and transmits the encoded video data.

The cameras are properly placed so as to cover the system FOV up to 360 degree horizontally and 180 degree vertically. For example, as shown in FIG. 2A, the image capture module 11 includes six cameras (not shown) respectively mounted on the six faces of a cube framework 21 to simultaneously capture a view of the world with 360-degree horizontal FOV and 180-degree vertical FOV to generate six camera images. In order to store and display conveniently on computer screens, a spherical projection is mapped to an equirectangular panoramic image. Its aspect ratio is chosen to be 2:1, with the horizontal coordinate representing the azimuth angle $\theta \in 0°\sim360°$, and the vertical coordinate representing the elevation angle $\varphi \in -90°\sim90°$. FIG. 2B shows an equirectangular panoramic image derived from an equirectangular projection of the six camera images from the six cameras of the image capture module 11 in FIG. 2A. Referring to FIG. 2B, pixels in regions 26 are overlapping by three camera images and pixels in regions 24-25 are overlapping by two camera images while pixels in regions 26 comes from a single camera image. Thus, the image processing apparatus 13 needs to perform blending operations over the overlap regions for stitching the six camera images.

In an ideal case, the six cameras (including camera #1 and camera #2) simultaneously located at the center 32 of the cube framework 21, so a single ideal imaging point 33 derived from a far object 35 is located on an image plane 22 with 2 meter radius (r=2) as shown in the left portion of FIG. 3A. Thus, referring to the right portion of FIG. 3A, since the ideal imaging position 33 in the camera image #1 (from camera #1) matches the ideal image position 33 in the camera image #2 (from camera #2), a perfect stitching/blending result is shown in the equirectangular panoramic image after an image stitching/blending process is completed by the image processing apparatus 13. However, in real cases, the real focal points 36 and 37 for camera #1 and camera #2 are separated from the optimal focal point 32 so that two real imaging positions 38 derived from a far object 35 are separately located on the image plane 22 as shown in the left portion of FIG. 3B. Consequently, referring to the right portion of FIG. 3B, a mismatch image defect is clearly shown in the equirectangular panoramic image after an image stitching/blending process is completed by the image processing apparatus 13.

What is needed is a compensation method/device used in a 360 camera system to lessen the mismatch image defect caused by shifted camera centers of the image capture module 11 and provide best image quality for panoramic images.

SUMMARY OF THE INVENTION

In view of the above-mentioned problems, an object of the invention is to provide an image processing system that minimizes the mismatch image defect caused by shifted camera centers of an image capture module and provides best image quality for panoramic images.

One embodiment of the invention provides a vertex processing device applied in an image processing system having an image capture module that generates camera images. The vertex processing device comprises a coefficient interpolation unit and a coordinate modifying unit. The coefficient interpolation unit generates an interpolated warping coefficient for each camera image with respect to each vertex from a vertex list based on n number of warping coefficients and its original texture coordinates in each camera image. The coordinate modifying unit calculates modified texture coordinates in each camera image for each vertex according to the interpolated warping coefficient and its original texture coordinates in each camera image. The vertex list comprises a plurality of vertices with their data structures that define vertex mapping between the camera images and a panoramic image. The n number of warping coefficients respectively denote warping degrees for n number of overlap regions in the panoramic image and n>=1.

Another embodiment of the invention provides an image processing system that receives a first vertex list from a calibration device and generates a panoramic image. The system comprises an image capture module, a vertex processing device, an image processing apparatus, and an optimizing unit. The image capture module generates a plurality of camera images. The vertex processing device modifies all the texture coordinates for all vertices from the first vertex list based on n number of warping coefficients to generate a second vertex list. The image processing apparatus selectively forms the panoramic image according to the camera images and the second vertex list, and measures n number of region errors for n number of overlap regions in the panoramic image. The optimizing unit generates the n number of warping coefficients according to the n number of region errors. The vertex processing device comprises a coefficient interpolation unit and a coordinate modifying unit. The coefficient interpolation unit generates an interpolated warping coefficient for each camera image with respect to each vertex from a vertex list based on n number of warping coefficients and its original texture coordinates in each camera image. The coordinate modifying unit calculates modified texture coordinates in each camera image for each vertex according to the interpolated warping coefficient and its original texture coordinates in each camera image. Here, each of the first vertex list and the second vertex list comprises a plurality of vertices with their data structures that define a vertex mapping between the camera images and the panoramic image. The n number of warping coefficients respectively denote warping degrees for n number of overlap regions in the panoramic image and n>=1.

Another embodiment of the invention provides a vertex processing method applied in an image processing system having an image capture module that generates a plurality of camera images. The method comprises the steps of: obtaining an interpolated warping coefficient for each camera image with respect to each vertex from a vertex list based on n number of warping coefficients and its original texture coordinates in each camera image; and, calculating modified texture coordinates in each camera image for each vertex according to the interpolated warping coefficient and its original texture coordinates in each camera image. Here, the vertex list comprises a plurality of vertices with their data structures that define a vertex mapping between the camera images and a panoramic image. The n number of warping coefficients respectively denote warping degrees for n number of overlap regions in the panoramic image and n>=1.

Another embodiment of the invention provides an image processing method that receives a first vertex list from a calibration device and generates a panoramic image. The method comprises the step of: modifying all the texture coordinates for all vertices from the first vertex list based on n number of warping coefficients to generate a second vertex list; selectively forming the panoramic image according to a plurality of camera images from an image capture module and the second vertex list; measuring n number of region errors for n number of overlap regions in the panoramic image; and, obtaining the n number of warping coefficients according to the n number of region errors. The step of modifying comprises: obtaining an interpolated warping coefficient for each camera image with respect to each vertex from the first vertex list based on the n number of warping coefficients and its original texture coordinates in each camera image; and, calculating modified texture coordinates in each camera image for each vertex according to the interpolated warping coefficient and its original texture coordinates in each camera image. Here, each of the first vertex list and the second vertex list comprises a plurality of vertices with their data structures that define a vertex mapping between the camera images and the panoramic image. The n number of warping coefficients respectively denote warping degrees for n number of overlap regions in the panoramic image and n>=1.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6F is an example showing an object 31 is located "on" the sphere/image plane 22.

DETAILED DESCRIPTION OF THE INVENTION

Figure 1:
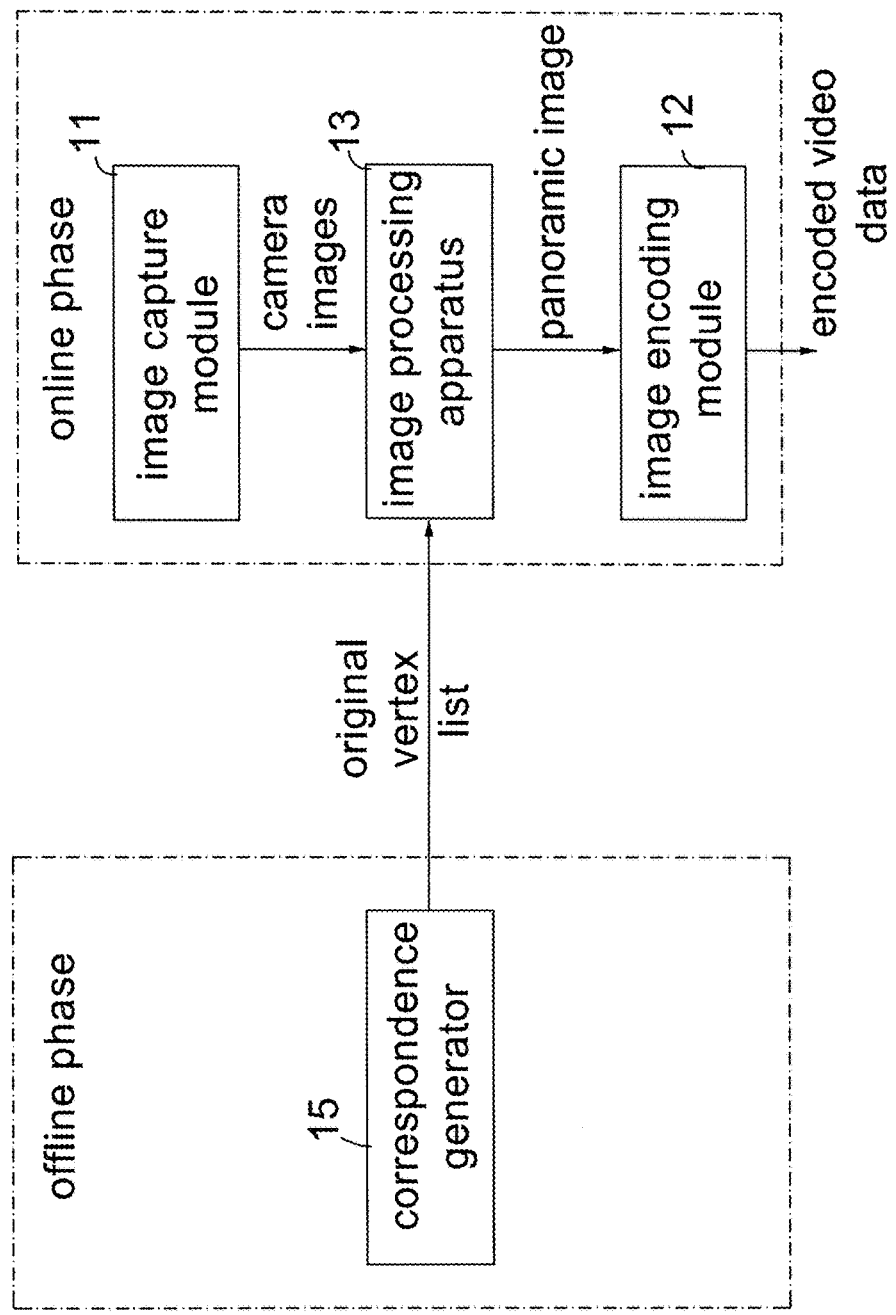
FIG. 1 is a diagram showing a panoramic image processing system of the invention.

As used herein and in the claims, the term "and/or" includes any and all combinations of one or more of the associated listed items. The use of the terms "a" and "an" and "the" and similar referents in the context of describing the invention are to be construed to cover both the singular and the plural, unless otherwise indicated herein or clearly contradicted by context. Throughout the specification, the same components and/or components with the same function are designated with the same reference numerals.

A feature of the invention is to minimize the mismatch image defect caused by shifted camera centers of the image capture module 11.

Figure 4A:
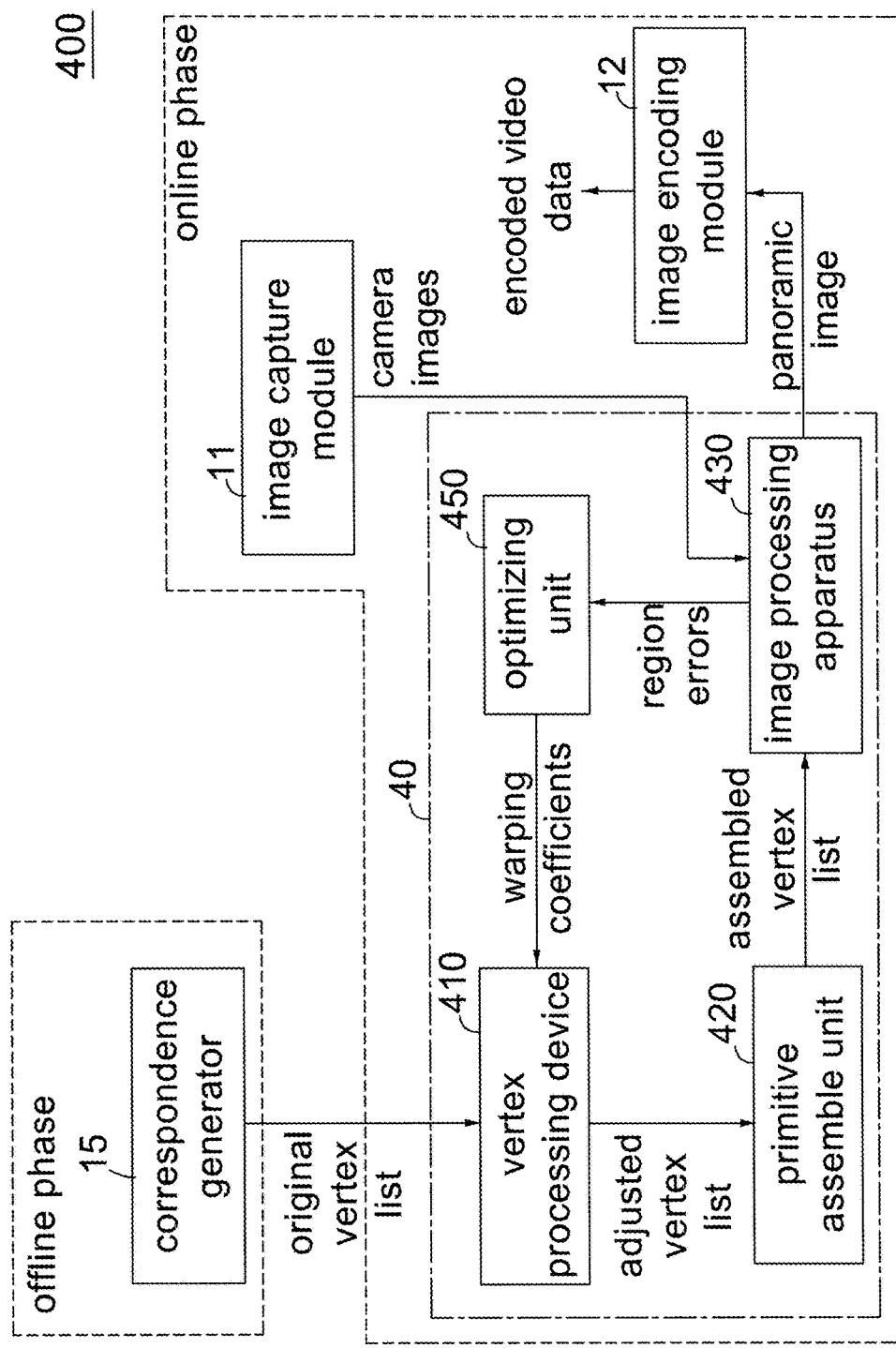
FIG. 4A is a diagram showing a panoramic image processing system of the invention.

FIG. 4A is a diagram showing a panoramic image processing system of the invention. Referring to FIG. 4A, the panoramic image processing system 400 includes an image capture module 11, a compensation device 40, an image encoding module 12, and a correspondence generator 15. The compensation device 40 includes a vertex processing device 410, an optimize unit 450, a primitive assemble unit 420 and an image processing apparatus 430.

The image capture module 11 is capable of capturing a view with 360 degree horizontal FOV and 180 degree vertical FOV to generate a plurality of camera images. After receiving the camera images from the image capture module 11, the image processing apparatus 430 performs rasterization, texture mapping and blending operations to form a panoramic image according to an assembled vertex list (will be described later); besides, the image processing apparatus 430 also generates region errors. Then, the image encoding module 12 encodes the panoramic image and transmits the encoded video data.

Figure 5B:
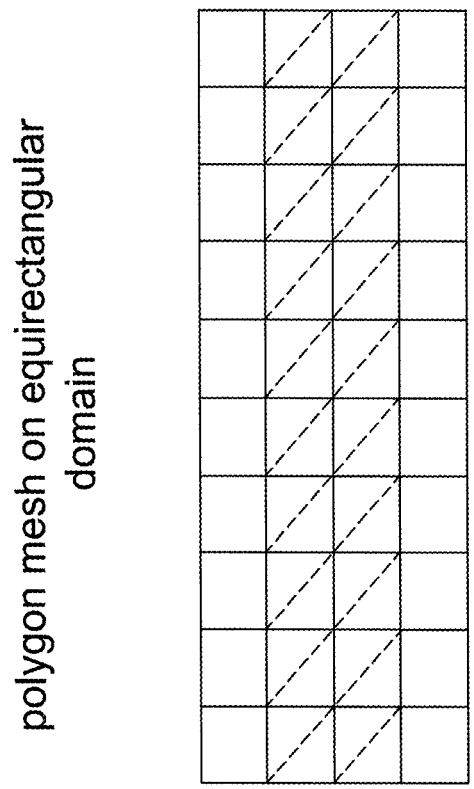
FIG. 5B shows a polygon mesh composing/modeling the equirectangular panoramic image.
Figure 5A:
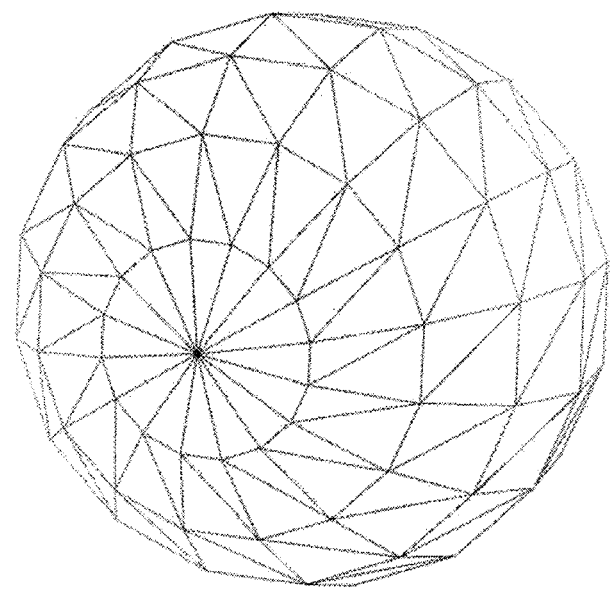
FIG. 5A shows a triangle mesh modeling a surface of the sphere 22.

FIG. 5A shows a triangle mesh modeling a surface of the sphere 22. FIG. 5B shows a polygon mesh composing/modeling the equirectangular panoramic image. The polygon mesh of FIG. 5B is produced by performing an equirectangular projection of the triangle mesh of FIG. 5A. The polygon mesh in FIG. 5B is a collection of quadrilaterals/triangles. Please note that only the top row and the bottom row of the polygon mesh in FIG. 5B are formed by quadrilaterals because they are projected from pole triangles of the triangle mesh in FIG. 5A. The term "pole triangle" refers to a triangle with a vertex being a pole point (Zenith, Nadir) in the triangle mesh modeling the surface of the sphere 22 as shown in FIG. 5A.

Figure 2B:
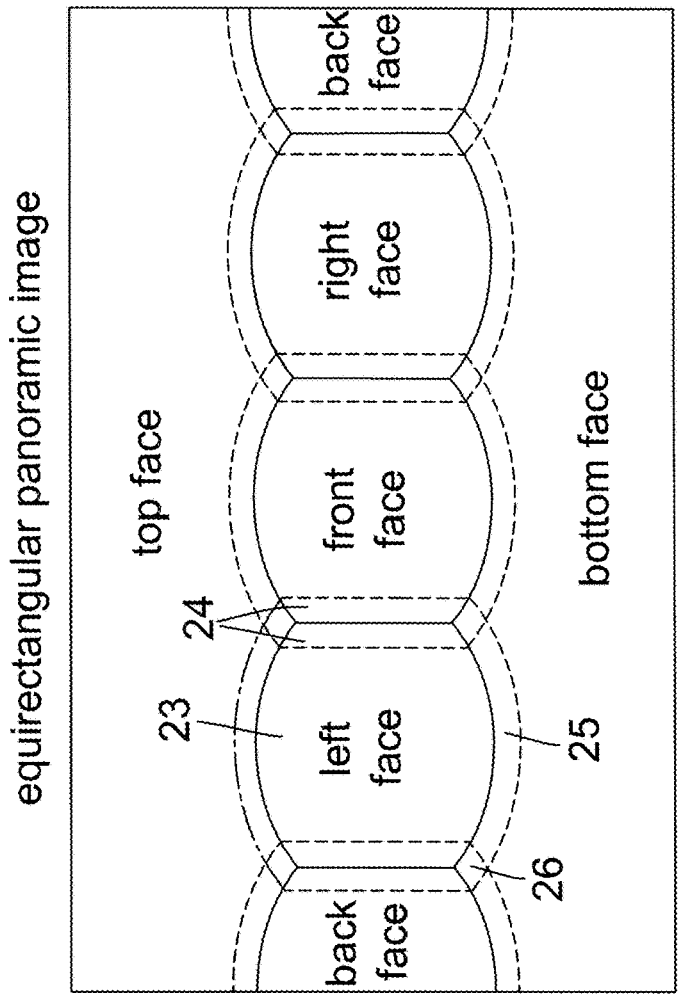
FIG. 2B shows an equirectangular panoramic image derived from an equirectangular projection of six-face camera images (top, bottom, right, left, front, back) from the image capture module 160.
Figure 2A:
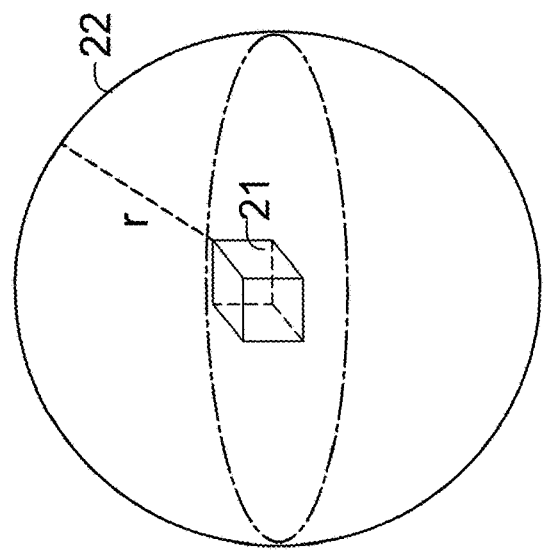
FIG. 2A shows a relation between a cube framework and a sphere.
Figure 3A:
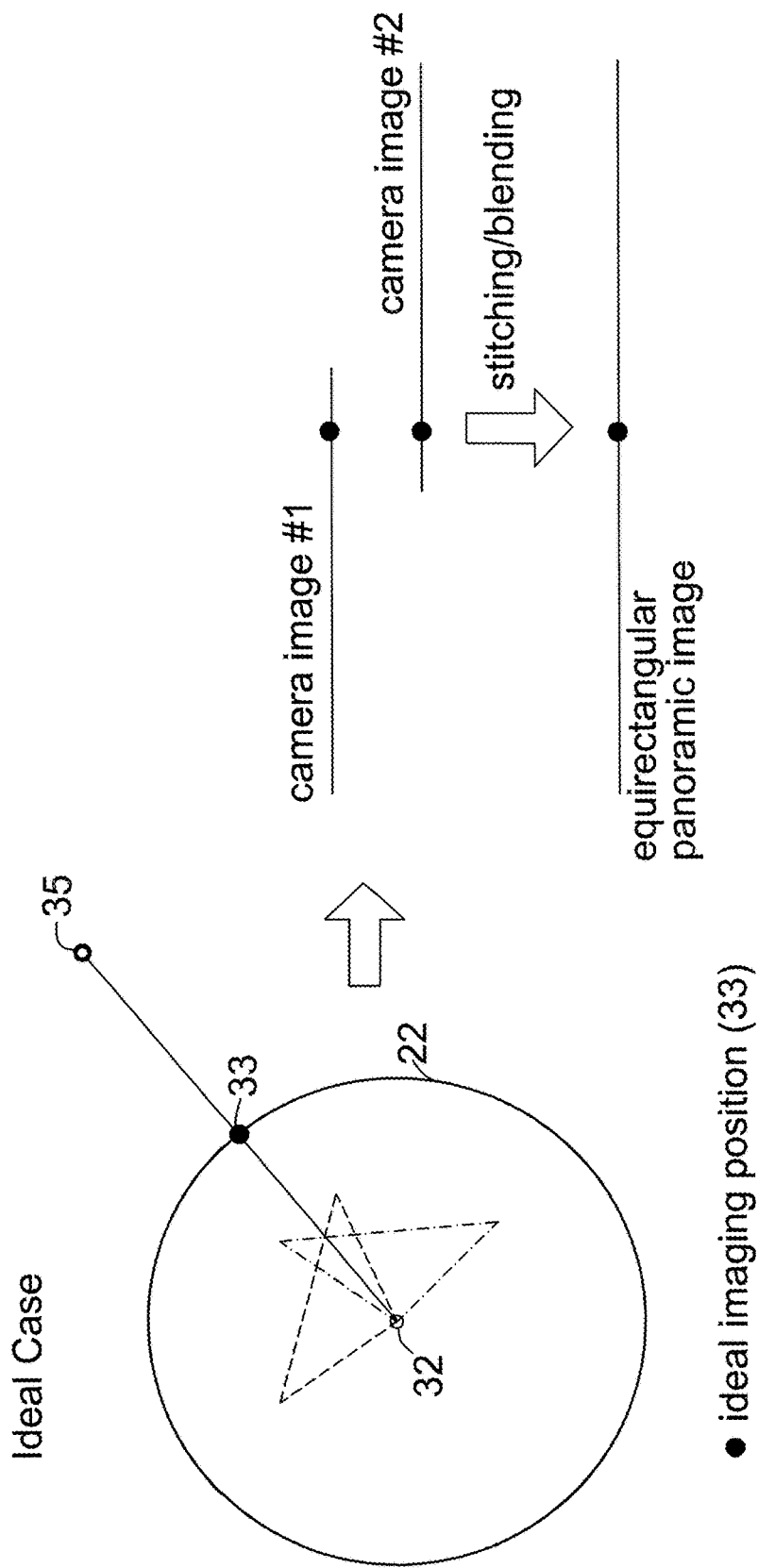
FIGS. 3A and 3B show different stitching results derived from un-shifted/shifted camera centers.
Figure 3B:
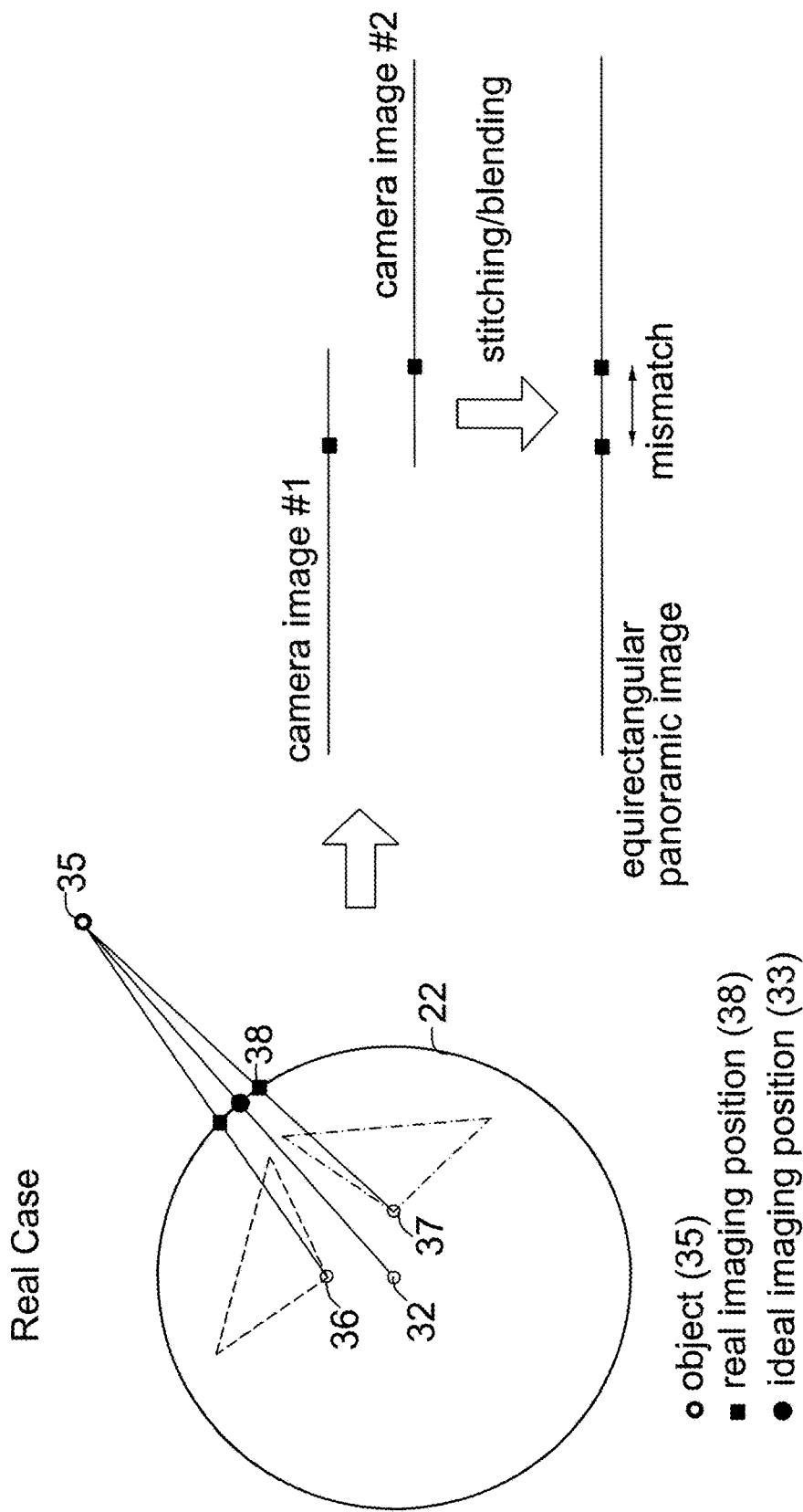

The image capture module 11 includes a plurality of cameras. The cameras are properly placed so as to cover the system FOV up to 360 degree horizontally and 180 degree vertically. In one embodiment, as shown in FIG. 2A, the image capture module 11 includes six cameras (not shown) respectively mounted on the six faces of a cube framework 21 to simultaneously capture a view of the world with 360-degree horizontal FOV and 180-degree vertical FOV to generate six camera images. In an alternative embodiment, the image capture module 11 includes two fish-eye lens (not shown). A requirement is that there should be sufficient overlaps between the views of two adjacent cameras/lenses to facilitate the image mosaicking. Please note that the number of the cameras/fish-eye lenses is not limited as long as they are able to capture a FOV up to 360 degree horizontally and 180 degree vertically. Examples of the panoramic image include, without limitation, a 360 degree panoramic image and an equirectangular panoramic image.

For purposes of clarity and ease of description, hereinafter, the following examples and embodiments will be described with the equirectangular panoramic image and with the assumption that the image capture module 11 includes the six cameras respectively mounted on the six faces of the cube framework 21 as shown in FIG. 2A and generating six camera images (top, bottom, right, left, front, back).

FIG. 4A also shows the processing pipeline of the panoramic image processing system 400. The processing pipeline is divided into an offline phase and an online phase. In the offline phase, the six cameras are calibrated separately. The correspondence generator 15 adopts appropriate image registration techniques to generate an original vertex list, and each vertex in the original vertex list provides the mapping between the equirectangular panoramic image and camera images (or between the equirectangular coordinates and the texture coordinates). For example, the sphere 22 with 2 meter radius (r=2) is drawn in many circles as latitude and longitude, whose intersection points are treated as calibration points. The six cameras capture these calibration points, and their positions on camera images are known. Then the mapping relationship between the equirectangular panoramic image and camera images are constructed since the view angles of the calibration points and camera coordinates are linked. A calibration point with the mapping relationship is defined as a "vertex" in this invention. The correspondence generator 15 completes all necessary computations in the offline phase.

According to the geometry of the equirectangular panoramic image and camera images, the correspondence generator 15 computes equirectangular coordinates and texture coordinates for each vertex in the polygon mesh and determines whether the vertex is a pole point (Zenith, Nadir) to generate an original vertex list. Afterward, the correspondence generator 15 supplies the original vertex list to the vertex processing device 410. As disclosed in U.S. patent application Ser. No. 15/211,732, the original vertex list is a list of a plurality of vertices forming a plurality of quadrilaterals of the polygon mesh (FIG. 5B) and each vertex is defined by its corresponding data structure. The data structure defines a vertex mapping between a destination space and a texture space (or between the equirectangular coordinates and the texture coordinates). In an embodiment, the data structure in the original vertex list includes, without limitation, equirectangular coordinates, the pole flag, the number of covering/overlapping camera images, texture coordinates in each camera image, ID for each camera image and a blending weight for each camera image. Table 1 shows an exemplary data structure of each vertex in the original vertex list.

TABLE 1

| Attributes | Descriptions |
| --- | --- |
| (x, y) | Equirectangular coordinates |
| N | Number of covering/overlapping camera images |
| Pole flag | Indicate whether the vertex is a pole point(e.g., 1: pole point; 0: not pole point) |
| $ID_1$ | ID of first camera image |
| $(u_1, v_1)$ | Texture coordinates in first camera image |
| $w_1$ | Blending weight for first camera image |
| ... | ... |
| $ID_N$ | ID of $N^{th}$ camera image |
| $(u_N, v_N)$ | Texture coordinates in $N^{th}$ camera image |
| $w_N$ | Blending weight for $N^{th}$ camera image |

In the online phase, minimal work is conducted to create the equirectangular panoramic image. The vertex processing device 410 receives the original vertex list and warping coefficients C(1)~C(n) for each overlap region R(1)~R(n) in the equirectangular panoramic image, modifies all texture coordinates for each vertex and generates an adjusted vertex list. Here, n denotes the number of overlap regions in the equirectangular panoramic image and n>=1. The primitive assemble unit 420 receives the adjusted vertex list and generates an assembled vertex list. According to the assembled vertex list, the image processing apparatus 430 simply regards the subsequent camera images from the image capture module 11 as textures, maps them onto the polygon mesh and stitches them together to form the equirectangular panoramic image in real time. Besides, the image processing apparatus 430 measures region errors E(1)~E(n) for overlap regions R(1)~R(n) in the equirectangular panoramic image, and outputs the region errors E(1)~E(n). Then, the optimize unit 450 receives the region errors E(1)~E(n) and generates the corresponding warping coefficients C(1)~C(n).

In one embodiment, the vertex processing device 410 modifies all the texture coordinates of all camera images for each vertex from the original vertex list on a vertex-by-vertex basis according to warping coefficients C(1)~C(n) to generate the adjusted vertex list. For example, if the data structure of a target vertex P indicates N (the number of covering/overlapping camera images) is equal to 3, the vertex processing device 410 respectively modifies the three pairs of texture coordinates in the three-face camera images related to the target vertex P based on the warping coefficients C(1)~C(n). The warping coefficients C(1)~C(n) respectively denote different warping degrees for the overlap regions R(1)~R(n). In other words, the overlap region R(1) has a warping degree/coefficient of C(1), the overlap region R(2) has a warping degree/coefficient of C(2) and so forth.

Figure 6A:
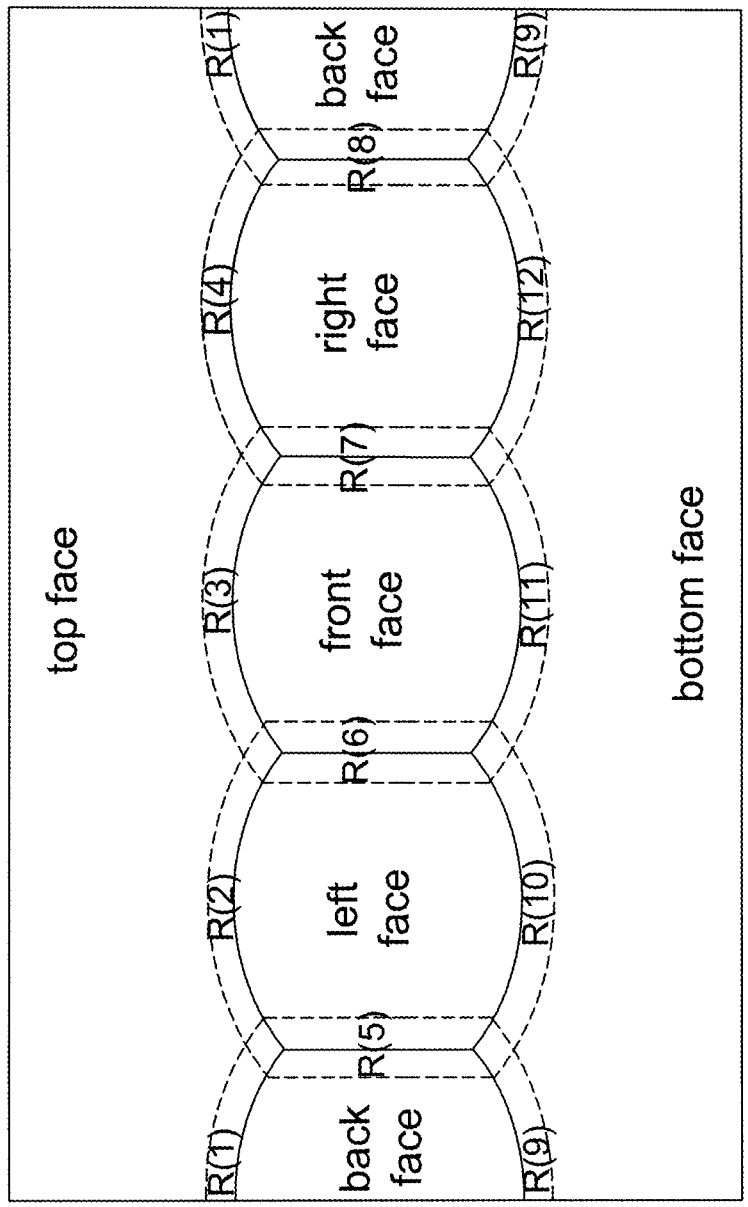
FIG. 6A shows an exemplary equirectangular panoramic image with twelve overlap regions.

FIG. 6A shows an exemplary equirectangular panoramic image with twelve overlap regions (n=12). Please note that the twelve overlap regions (n=12) are provided by way of example and not limitations of the invention. For purposes of clarity and ease of description, hereinafter, the following examples and embodiments will be described with twelve overlap regions R(1)~R(12) in the equirectangular panoramic image, i.e., n=12.

Figure 4B:
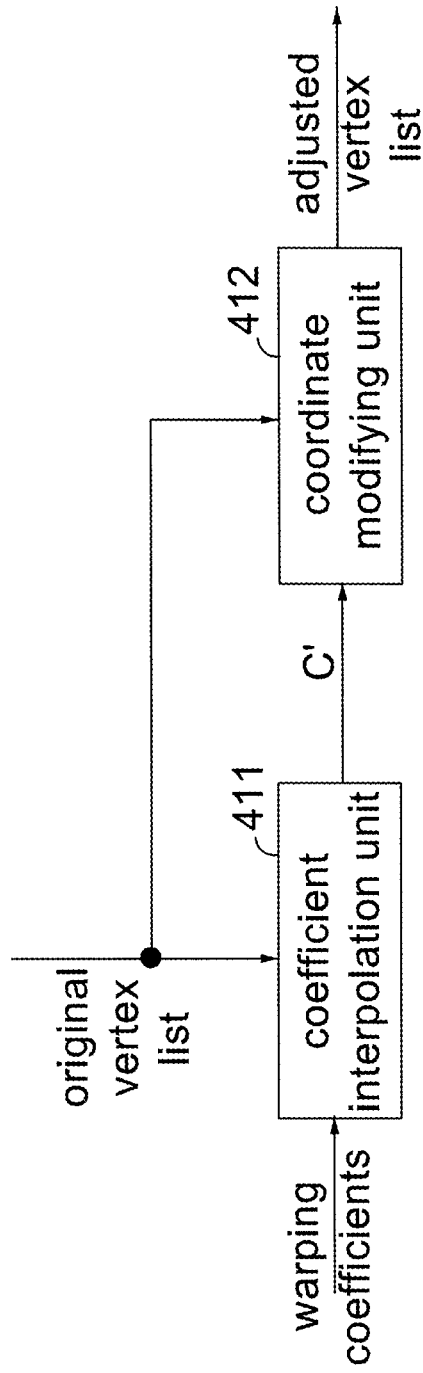
FIG. 4B is a diagram showing a vertex processing device according to an embodiment of the invention.
Figure 6B:
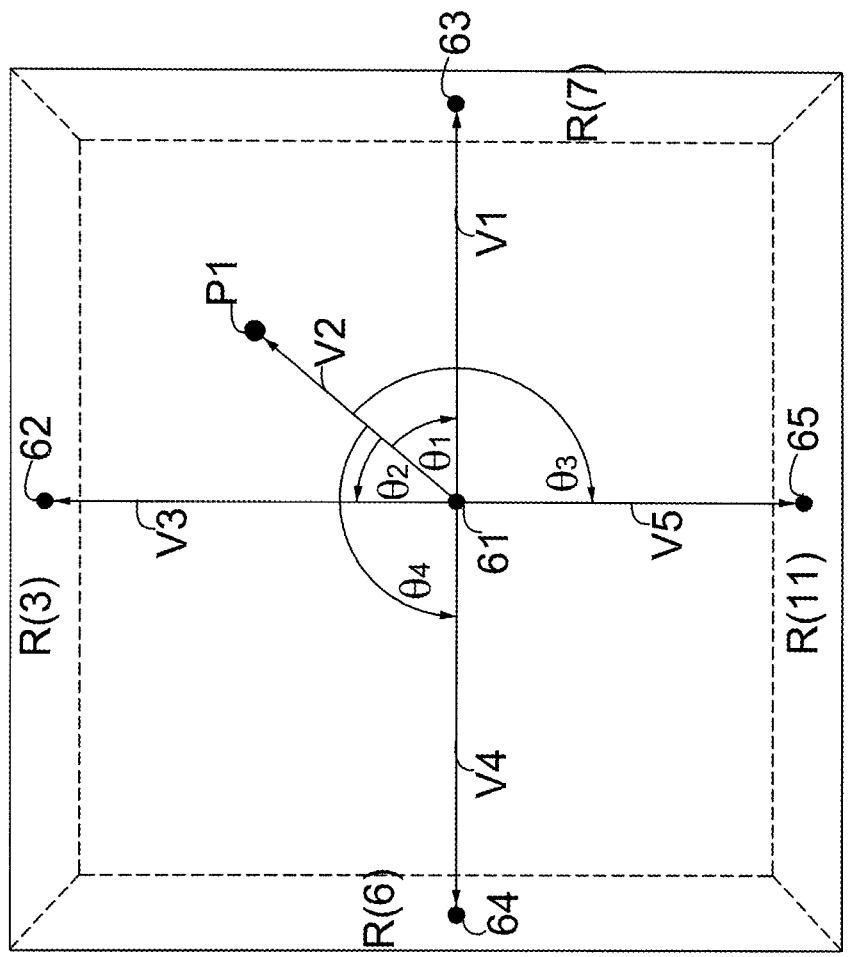
FIG. 6B is an example showing a relation between the target vertex P1 and the center 61 of the front-face camera image.

FIG. 4B is a diagram showing a vertex processing device according to an embodiment of the invention. Referring to FIG. 4B, the vertex processing device 410 comprises a coefficient interpolation unit 411 and a coordinate modifying unit 422. In the example of FIG. 6A, there are twelve overlap regions R(1)~R(12) in the equirectangular panoramic image, and thus the overlap regions R(1)~R(12) respectively have warping coefficients C(1)~C(12). At first, the coefficient interpolation unit 411 receives a target vertex P1 (with its data structure) from the original vertex list and twelve warping coefficients C(1)~C(12) from the optimize unit 450. Then, the coefficient interpolation unit 411 sequentially performs interpolation operations over the warping coefficients according to original texture coordinates of the target vertex P1 to generate an interpolated warping coefficient C' for each camera image associated with the target vertex P1. Take the front-face camera image for example. Assuming that the target vertex P1 has original texture coordinates (U1, V1) in front-face camera image. FIG. 6B is an example showing a relation between the target vertex P1 and the center 61 of the front-face camera image. Here, the overlap regions (R(3), R(6), R(7), R(11)) in the front-face camera image respectively have warping degrees of (C(3), C(6), C(7), C(11)). In one embodiment, the coefficient interpolation unit 411 generates the interpolated warping coefficient C' for the target vertex P1 with original texture coordinates (U1, V1) in the front-face camera by performing interpolation operation over the warping coefficients (C(3), C(7)) of its immediately-adjacent overlap regions (R(3), R(7)) according to two angles $\theta 1$ and $\theta 2$. In this embodiment, the interpolated warping coefficient C' for the target vertex P1 in the front-face camera is defined/calculated by the following equation: $C'=C(3)*\theta 1/(\theta 1+\theta 2)+C(7)*\theta 2/(\theta 1+\theta 2)$. Here, the angle $\theta 1$ is formed between a first vector V1 starting from the image center 61 (with texture coordinates ($U_{center}$, $V_{center}$)) to the location 63 of overlap region R(7) and a second vector V2 starting from the image center 61 to the target vertex P1 (U1, V1), and the angle $\theta 2$ is formed between the second vector V2 and a third vector V3 starting from the image center 61 to the location 62 of the overlap region R(3).

In an alternative embodiment, the coefficient interpolation unit 411 generates the interpolated warping coefficient C' for the target vertex P1 with original texture coordinates (U1, V1) in the front-face camera by performing interpolation operation over the warping coefficients (C(6), C(11)) of its adjacent overlap regions (R(6), R(11)) according to two angles $\theta 3$ and $\theta 4$. In this embodiment, the interpolated warping coefficient C' for the target vertex P1 in the front-face camera is defined/calculated by the following equation: $C'=C(6)*\theta 3/(\theta 3+\theta 4)+C(11)*\theta 4/(\theta 3+\theta 4)$. Here, the angle $\theta 3$ is formed between a fifth vector V5 starting from the image center 61 (with texture coordinates ($U_{center}$, $V_{center}$)) to the location 65 of overlap region R(11) and a second vector V2 starting from the image center 61 to the target vertex P1 (U1, V1), and the angle $\theta 4$ is formed between the second vector V2 and a fourth vector V4 starting from the image center 61 to the location 64 of the overlap region R(6).

In an alternative embodiment, the coefficient interpolation unit 411 generates the interpolated warping coefficient C' for the target vertex P1 with original texture coordinates (U1, V1) in the front-face camera by performing interpolation operation over the warping coefficients (C(6), C(7)) of its adjacent overlap regions (R(6), R(7)) according to two angles $\theta 1$ and $\theta 4$. In this embodiment, the interpolated warping coefficient C' for the target vertex P1 in the front-face camera is defined/calculated by the following equation: $C'=C(6)*\theta 1/(\theta 1+\theta 4)+C(7)*\theta 4/(\theta 1+\theta 4)$. Examples of the location (e.g., 62 or 63 or 64 or 65) of an overlap region (e.g., R(3) or R(7) or R(6) or R(11)) include, without limitation, a gravity center of the overlap region, a region center of the overlap region, a median point of the overlap region.

Please note that the number of warping coefficients of the adjacent overlap regions (with respect to the target vertex P1) equal to two are provided by way of example and not limitations of the invention. In practice, more than two warping coefficients (of more than two adjacent overlap regions) can be used to obtain the interpolated warping coefficient C' by using any existing interpolation algorithm, such as polynomial interpolation. In an alternative embodiment, the coefficient interpolation unit 411 generates the interpolated warping coefficient C' for the target vertex P1 with original texture coordinates (U1, V1) in the front-face camera by performing interpolation operations over more than warping coefficients of more than two adjacent overlap regions according to their angles. For example, based on "polynomial interpolation", the coefficient interpolation unit 411 calculates the interpolated warping coefficient C' for the target vertex P1 in the front-face camera using four warping coefficients (C(6), C(3), C(7), C(11)) and four angles ($\theta 1$, $\theta 2$, $\theta 3$, $\theta 4$)) by the following equation:

$$C' = C(6) * \frac{(\theta_1 * \theta_2 * \theta_3)}{(90*180*270)} + C(3) * \frac{(\theta_1 * \theta_3 * \theta_4)}{(90*90*180)} +$$
$$C(7) * \frac{(\theta_2 * \theta_3 * \theta_4)}{(90*90*180)} + C(11) * \frac{(\theta_1 * \theta_2 * \theta_4)}{(90*180*270)}$$

After receiving the interpolated warping coefficient C', the coordinate modifying unit 412 calculates modified texture coordinates (U1', V1') in the front-face camera image for the target vertex P1 according to the following equations: U1'=(U1−U$_{center}$)*C'+U$_{center}$, V1'=(V1−V$_{center}$)*C'+V$_{center}$. In this manner, the original texture coordinates (U1, V1) of the target vertex P1 is changed to the modified texture coordinates (U1', V1') in the front-face camera.

Likewise, four warping coefficients (C(1), C(5), C(8), C(9)) corresponding to the overlap regions (R(1), R(5), R(8), R(9)) are used to calculate modified texture coordinates for a vertex with its original texture coordinates in the back-face camera image; four warping coefficients (C(1), C(2), C(3), C(4)) corresponding to the overlap regions (R(1), R(2), R(3), R(4)) are used to calculate modified texture coordinates for a vertex with its original texture coordinates in the top-face camera image; four warping coefficients (C(9), C(10), C(11), C(12)) corresponding to the overlap regions (R(9), R(10), R(11), R(12)) are used to calculate modified texture coordinates for a vertex with its original texture coordinates in the bottom-face camera image and so on. In this manner, the vertex processing device 410 sequentially modifies all the texture coordinates in six-face camera images based on each vertex from the original vertex list according to warping coefficients C(1)~C(12) to generate the adjusted vertex list.

Figure 6C:
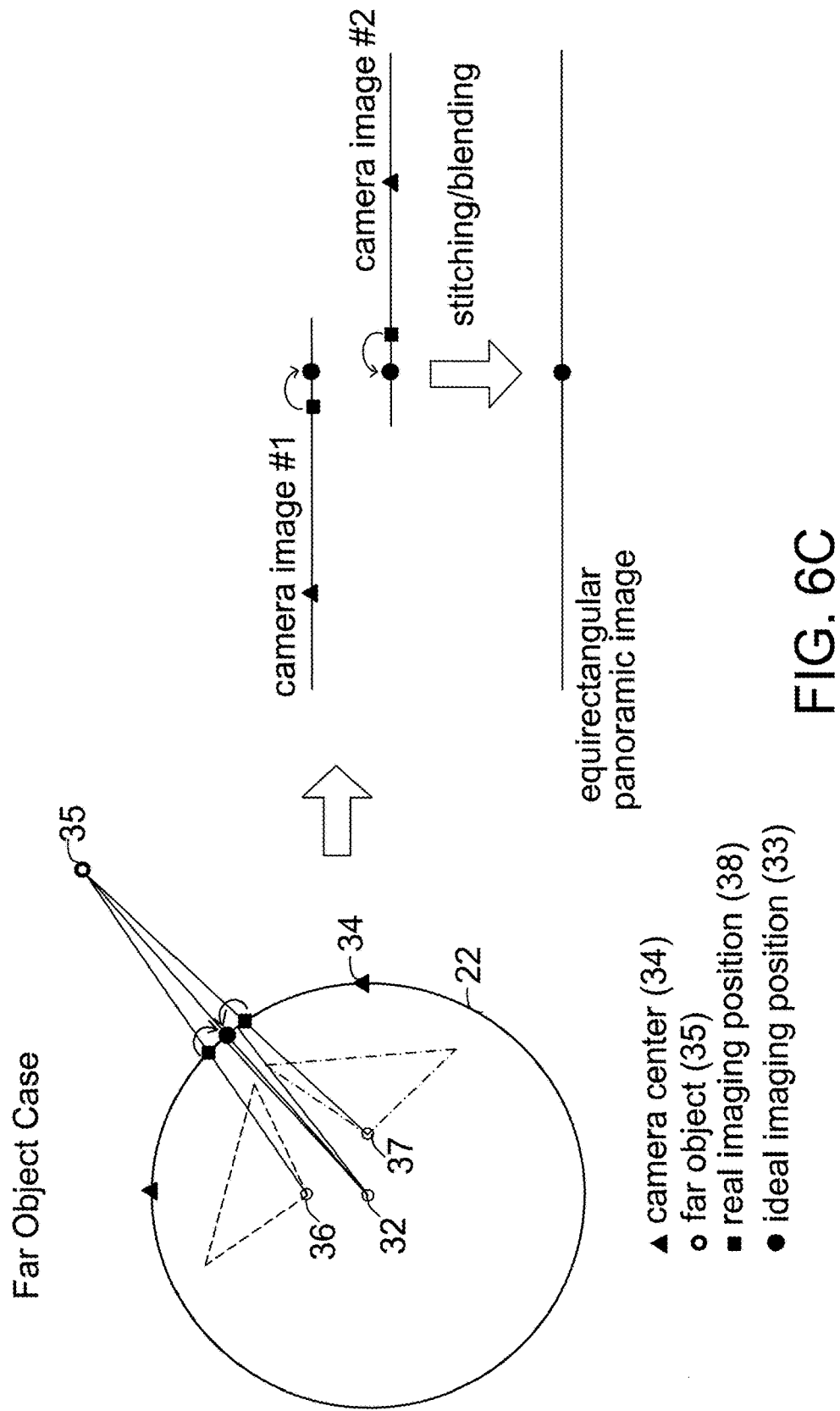
FIGS. 6C-6D show how the mismatch image defects are improved for a far object case and a near object case.
Figure 6D:
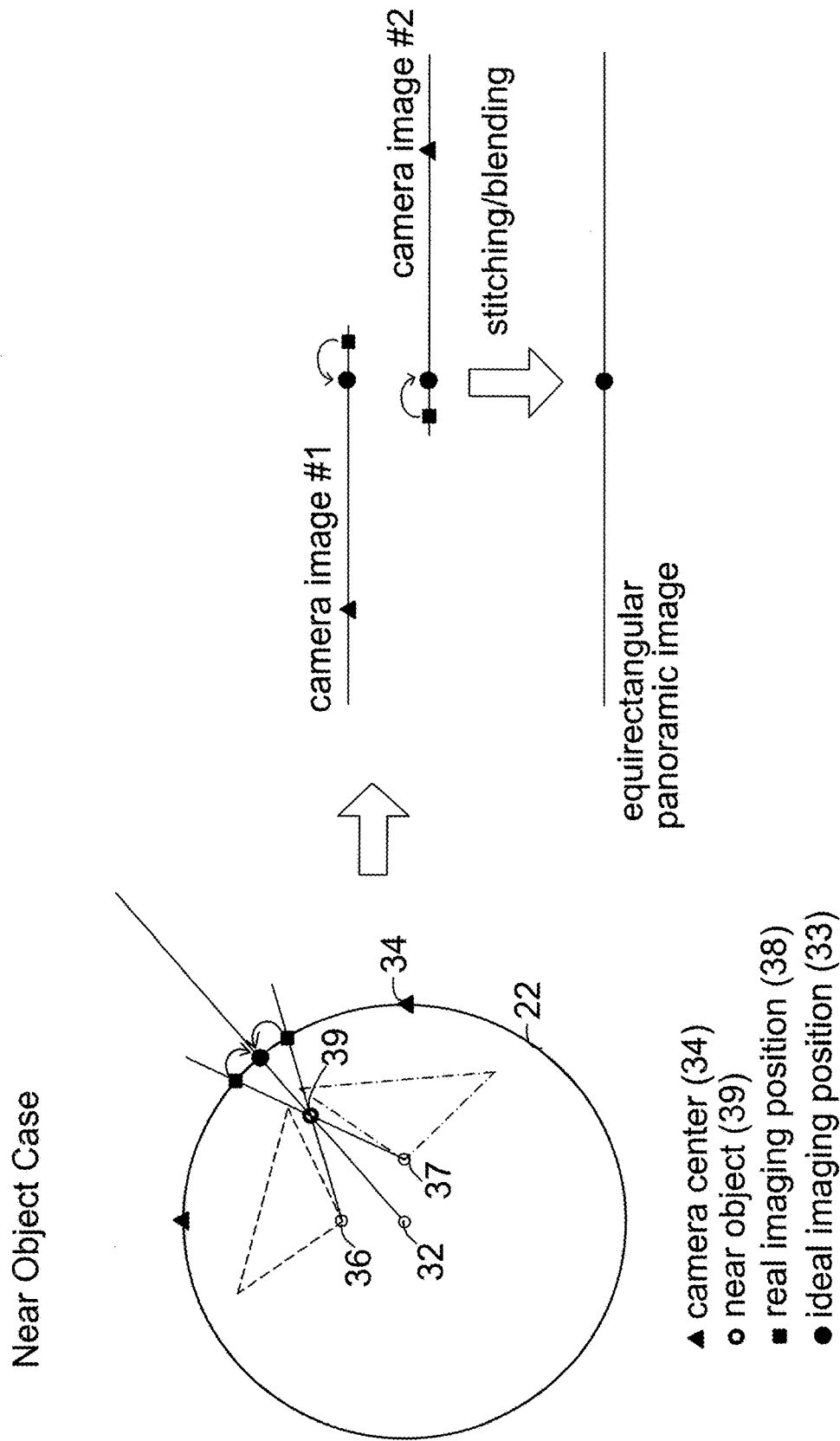

After all the texture coordinates of all vertices are modified according to warping coefficients (C(1)~C(12)) by the vertex processing device 410, the mismatch image defects would be greatly improved as shown in FIGS. 6C-6D. FIGS. 6C-6D show how the mismatch image defects are improved for a far object case and a near object case. The term "far object" refers to an object 35 located outside the sphere 22 (e.g., with 2 meter radius, r=2) as shown in FIG. 6C and the term "near object" refers to an object 39 located inside the sphere 22 as shown in FIG. 6D. Because the real focal points 36 and 37 for camera #1 and camera #2 are separated from the optimal focal point 32, two real imaging positions 38 on the image plane 22 are separately shifted from the ideal imaging position 33 as shown in FIGS. 6C-6D. In the far object case, its real imaging positions 38 are relatively close to the image centers 34, so the vertex processing device 410 needs to "push" its real imaging positions 38 away from the image centers 34 as shown in FIG. 6C. After the vertex processing device 410 modifies its texture coordinates (from positions 38 to positions 33) in the camera images #1 and #2 according to warping coefficients (C(1)~C(12)), the previous mismatch image defect is significantly improved. Contrarily, in the near object case, its real imaging positions 38 are relatively far from the image centers 34, so the vertex processing device 410 needs to "pull" its real imaging positions 38 nearer to the image centers 34 as shown in FIG. 6D. After the vertex processing device 410 modifies its texture coordinates (from positions 38 to positions 33) in the camera image #1 and the camera image #2 according to warping coefficients C(1)~C(12), the previous mismatch image defect is significantly improved.

Figure 6E:
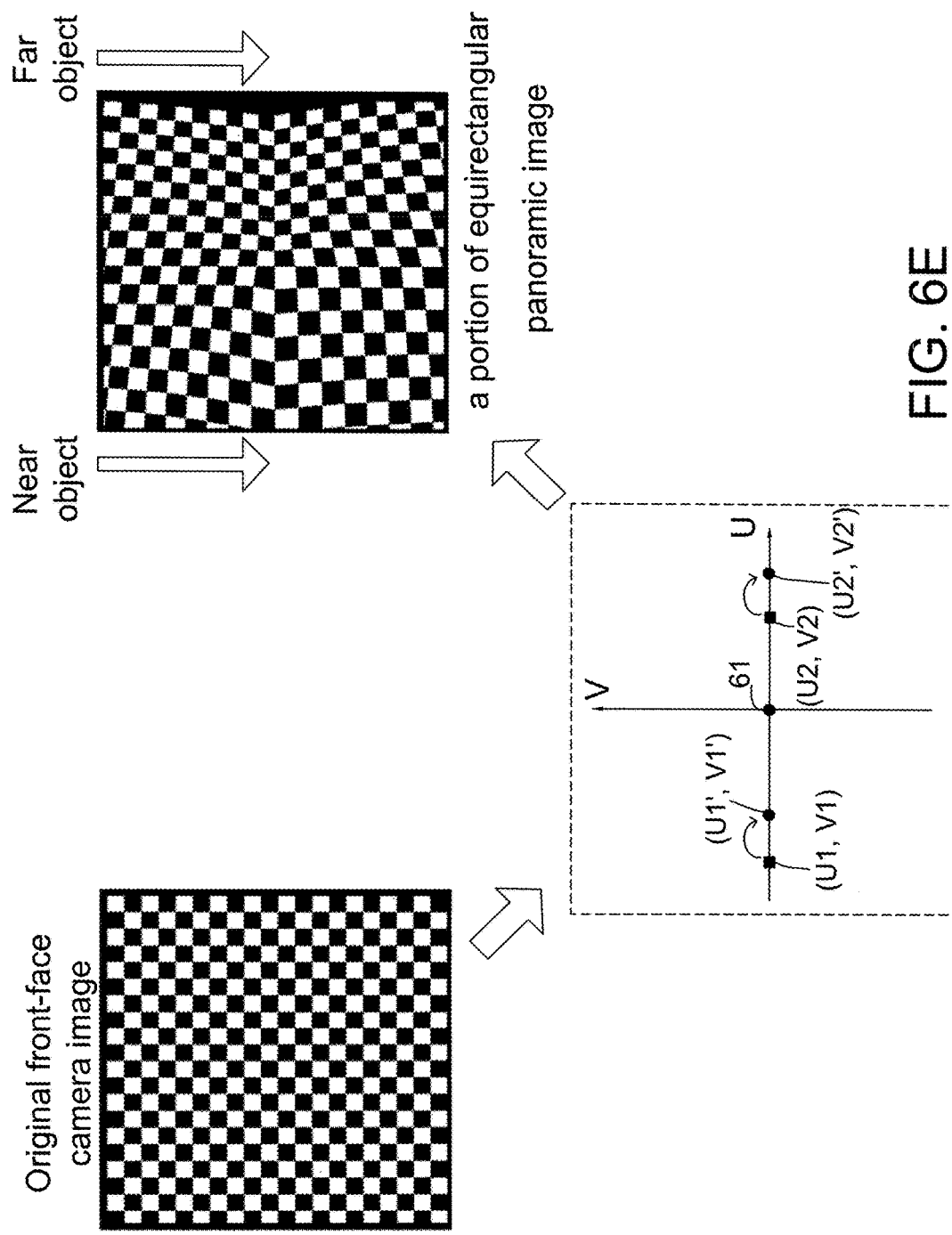
FIG. 6E is an example showing how an expansion image effect is created for a near object case and how a shrink image effect is created for a far object case.

According to the invention, the warping coefficients C(1)~C(n) are regarded as object depths at texture (or camera image) border. Again, take the front-face camera image for example, with the assumption that two vertices P1 and P2 with original texture coordinates (U1, V1) and (U2, V2), vertex P1 belongs to the near object case and vertex P2 belongs to the far object case as shown in FIG. 6E. As stated above, for the near object case of vertex P1, since the real imaging position (U1, V1) is relatively far from the image center 61, the vertex processing device 410 pulls the real imaging position (U1, V1) nearer to the image center 61. For the far object case of vertex P2, since the real imaging position (U2, V2) is relatively close to the image center 61, the vertex processing device 410 needs to "push" the real imaging position (U2, V2) away from the image center 61. With the assumption that C(3)=1, C(6)=0.8, C(7)=1.2 and C(11)=1, the vertex processing device 410 respectively modifies the original texture coordinates (U1, V1) of vertex P1 to (U1', V1') according to C(6) and modifies the original texture coordinates (U2, V2) of vertex P2 to (U2', V2') according to C(7) as shown in the lower portion of FIG. 6E. Due to the fact that the equirectangular coordinates (X1,Y1) of vertex P1 are unchanged, a pull-away or expansion image effect is created after the front-face camera image is mapped to the equirectangular panoramic image by the image processing apparatus 430. Due to the fact that the equirectangular coordinates (X2,Y2) of vertex P2 are unchanged, a shrink image effect is created after the front-face camera image is mapped to the equirectangular panoramic image by the image processing apparatus 430.

In a special case that an object 31 is located "on" the sphere/image plane 22, since the real imaging position 38 in the camera image #1 (from camera #1) matches the real image position 38 in the camera image #2 (from camera #2), a perfect stitching/blending result is shown in the equirectangular panoramic image after an image stitching/blending process is completed by the image processing apparatus 430 as shown in FIG. 6F. Accordingly, in this special case, no real imaging position and no texture coordinates need to be modified in the camera images #1 and #2; besides, the overlap region between the camera images #1 and #2 has a warping degree/coefficient of 1.

Figure 7A:
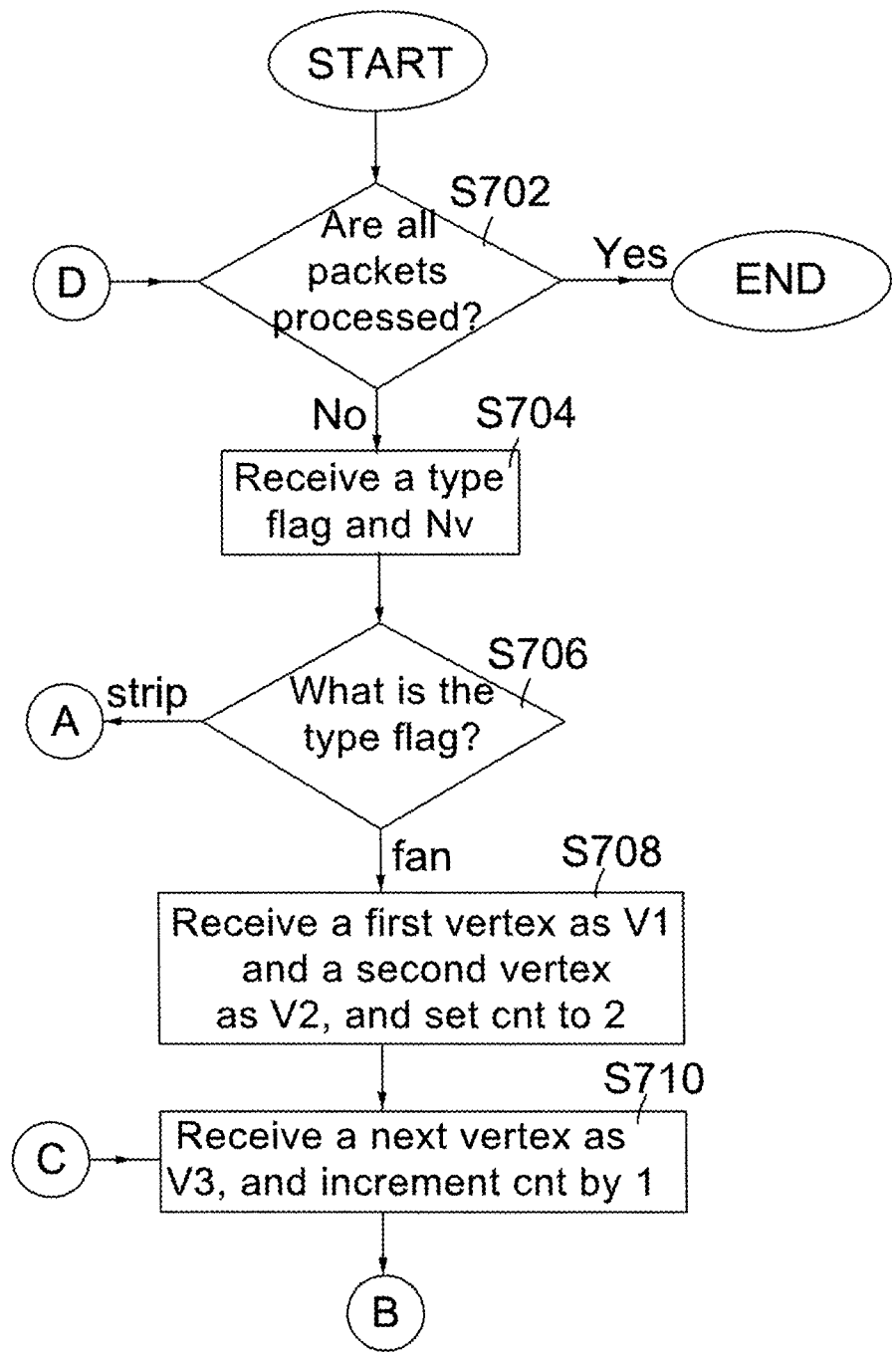
FIGS. 7A-7C are flow charts showing operations of the primitive assembly unit 420 according to the adjusted vertex list.
Figure 7B:
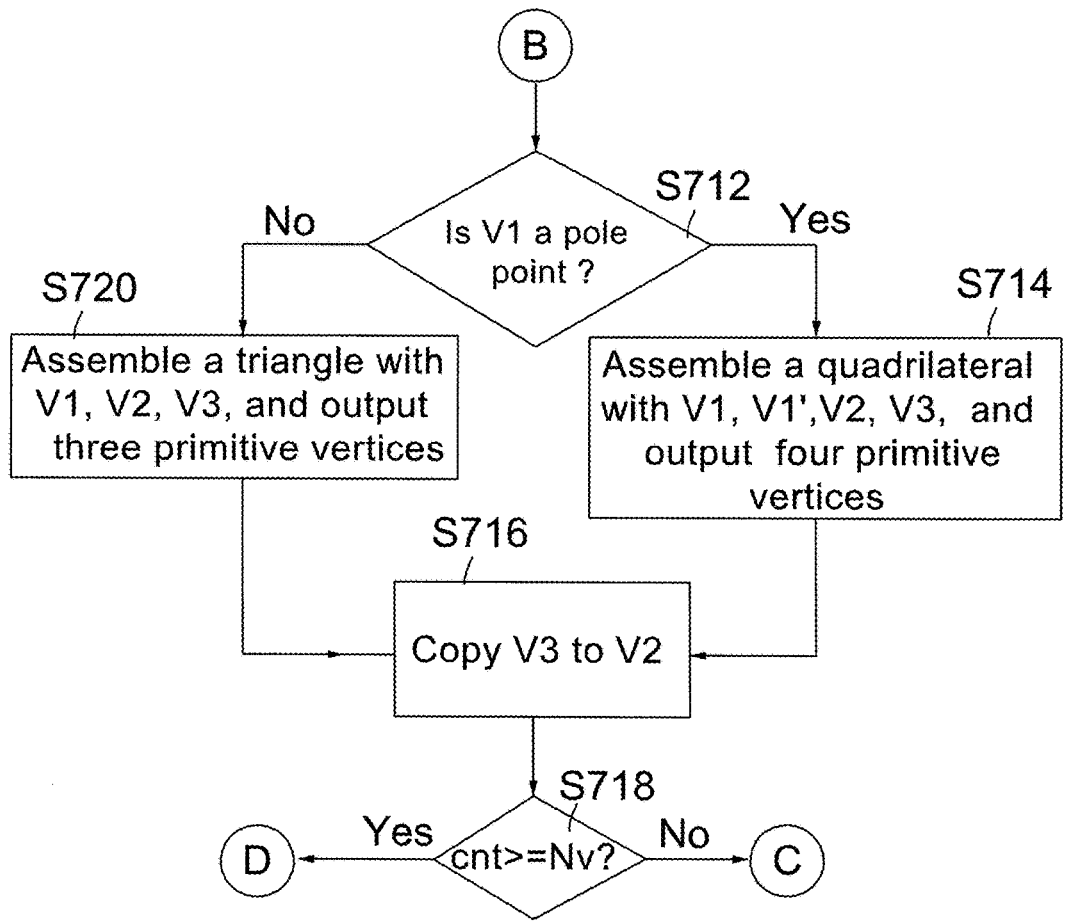
Figure 7C:
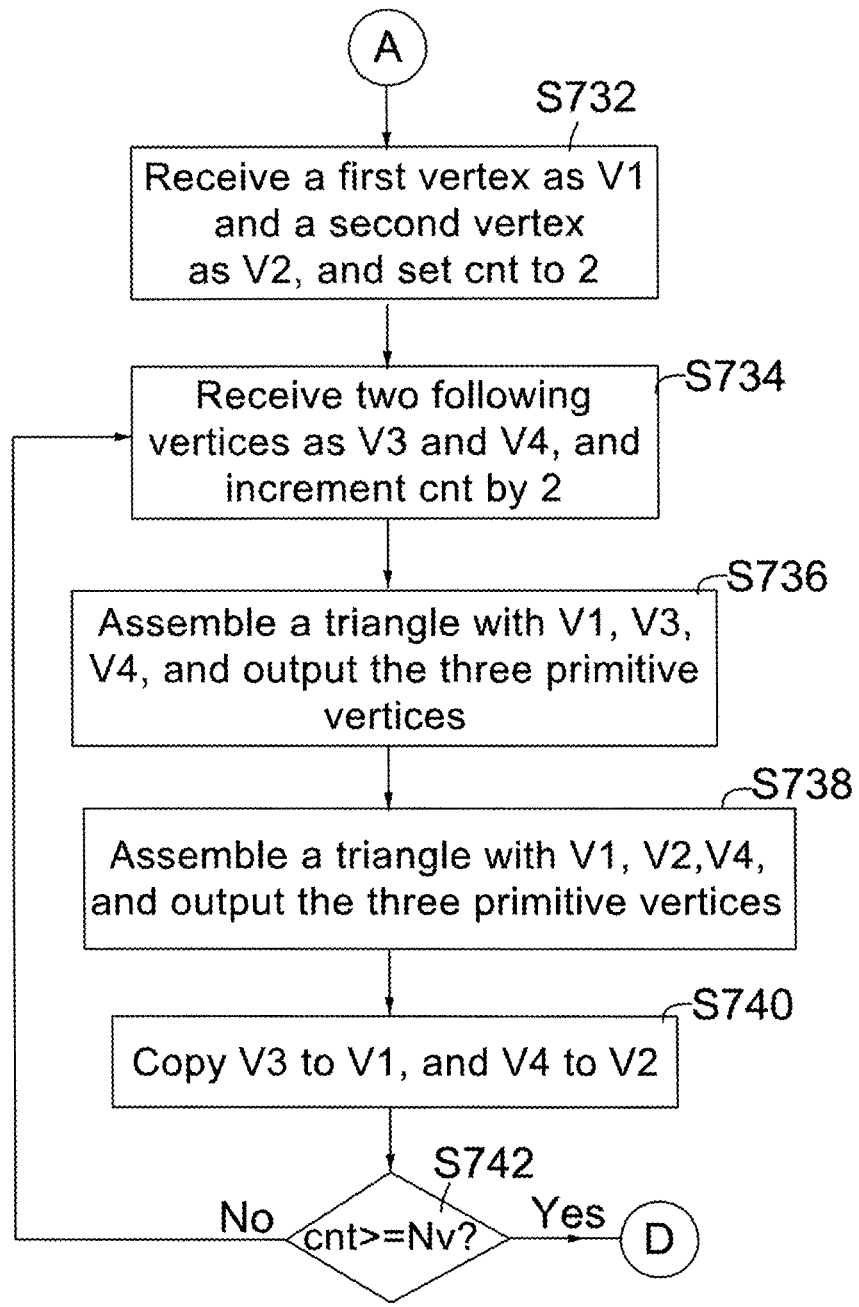
Figure 7D:
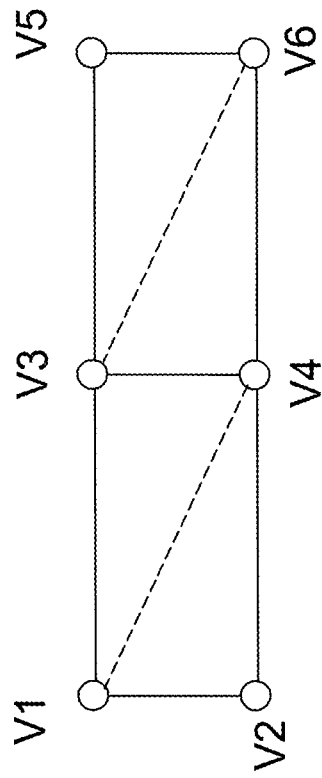
FIG. 7D shows two types of triangle meshes used in the adjusted vertex list as disclosed in U.S. patent application Ser. No. 15/333,765.
Figure 7D:
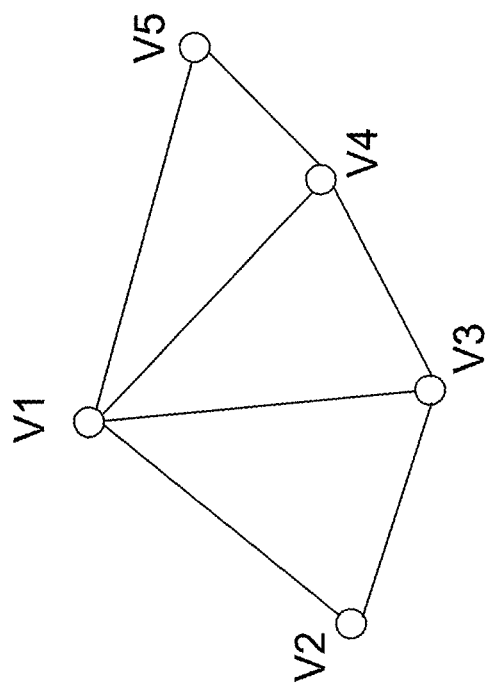

FIGS. 7A-7C are flow charts showing operations of the primitive assembly unit 420 according to the adjusted vertex list. FIG. 7D shows two types of triangle meshes used in the adjusted vertex list disclosed in U.S. patent application Ser. No. 15/333,765 (the disclosure of which is incorporated herein by reference in its entirety). Referring to FIG. 7D, there are two types of triangle meshes used in the adjusted vertex list: fan-type and strip-type. For example, the fan-type triangle mesh is applicable to the top row and bottom row of the polygon mesh as shown in FIG. 5B while the strip-type triangle mesh is applicable to the other rows of the polygon mesh. Please note that although the numbers (Nv) of vertices in the fan-type/strip-type triangle mesh are respectively five and six, they can be arbitrarily defined depending on different design needs. The adjusted vertex list comprises a plurality of mesh packets, and each mesh packet consists of a header and a payload. The header consists of a type flag (indicating fan-type or strip-type) and a number Nv. The number Nv specifies there are Nv vertices (i.e., Nv data structures) contained in the payload or triangle mesh. Hereinafter, the operations of the primitive assembly unit 420 are described with reference to FIGS. 4A, 5A-5B and 7A-7D. Assuming that, in advance, the vertex processing device 410 sends the adjusted vertex list to the primitive assembly unit 420.

Step S702: Determine whether all mesh packets from the adjusted vertex list are processed. If YES, the flow is terminated; otherwise, the flow goes to step S704.

Step S704: Receive a type flag and a number Nv. That is, a header of a mesh packet is received.

Step S706: Determine what the type flag is. If it is fan-type, the flow goes to step S708; if it is strip-type, the flow goes to step S732.

Step S708: Receive a first vertex as V1 and a second vertex as V2, and set a parameter cnt to 2.

Step S710: Receive a following vertex as V3 and increment cnt by 1.

Step S712: Determine whether the vertex V1 is a pole point according to its pole flag in its data structure. If YES, the flow goes to step S714; otherwise, the flow goes to step S720.

Step S714: Assemble a quadrilateral with vertices V1, V1', V2, V3, and output four primitive vertices V1, V1', V2, V3 with their data structures as a part of an assembled vertex list. As mentioned above, the fan-type triangle mesh is applicable to the top row and bottom row of the polygon mesh. Thus, since the vertex V1 is regarded as a pole point, the vertex V1' is equivalent to the vertex V1.

Step S716: Copy the vertex V3 to vertex V2. That is, the vertex V2 is replaced by the vertex V3.

Step S718: Determine whether cnt is greater than or equal to Nv. If YES, the flow goes to step S702; otherwise, the flow goes to step S710.

Step S720: Assemble a triangle with vertices V1, V2, V3, and output the three primitive vertices V1, V2, V3 with their data structures as a part of the assembled vertex list.

Step S732: Receive a first vertex as V1 and a second vertex as V2, and set a parameter cnt to 2.

Step S734: Respectively receive two following vertices as V3, V4 and increment cnt by 2. In this case, the quadrilateral V1-V4 is divided into two triangles V1, V3, V4 and V1, V2, V4.

Step S736: Assemble a triangle with vertices V1, V3, V4, and output three primitive vertices V1, V3, V4 with their data structures as a part of the assembled vertex list.

Step S738: Assemble a triangle with vertices V1, V2, V4, and output three primitive vertices V1, V2, V4 with their data structures as a part of the assembled vertex list.

Step S740: Copy the vertex V3 to vertex V1, and the vertex V4 to vertex V2. That is, the vertex V1 is replaced by the vertex V3, and the vertex V2 is replaced by the vertex V4.

Step S742: Determine whether cnt is greater than or equal to Nv. If YES, the flow goes to step S702; otherwise, the flow goes to step S734.

In brief, the primitive assembly unit 420 outputs a group of three primitive vertices if no pole point is included, and outputs a group of four primitive vertices if a pole point is included.

Figure 10A:
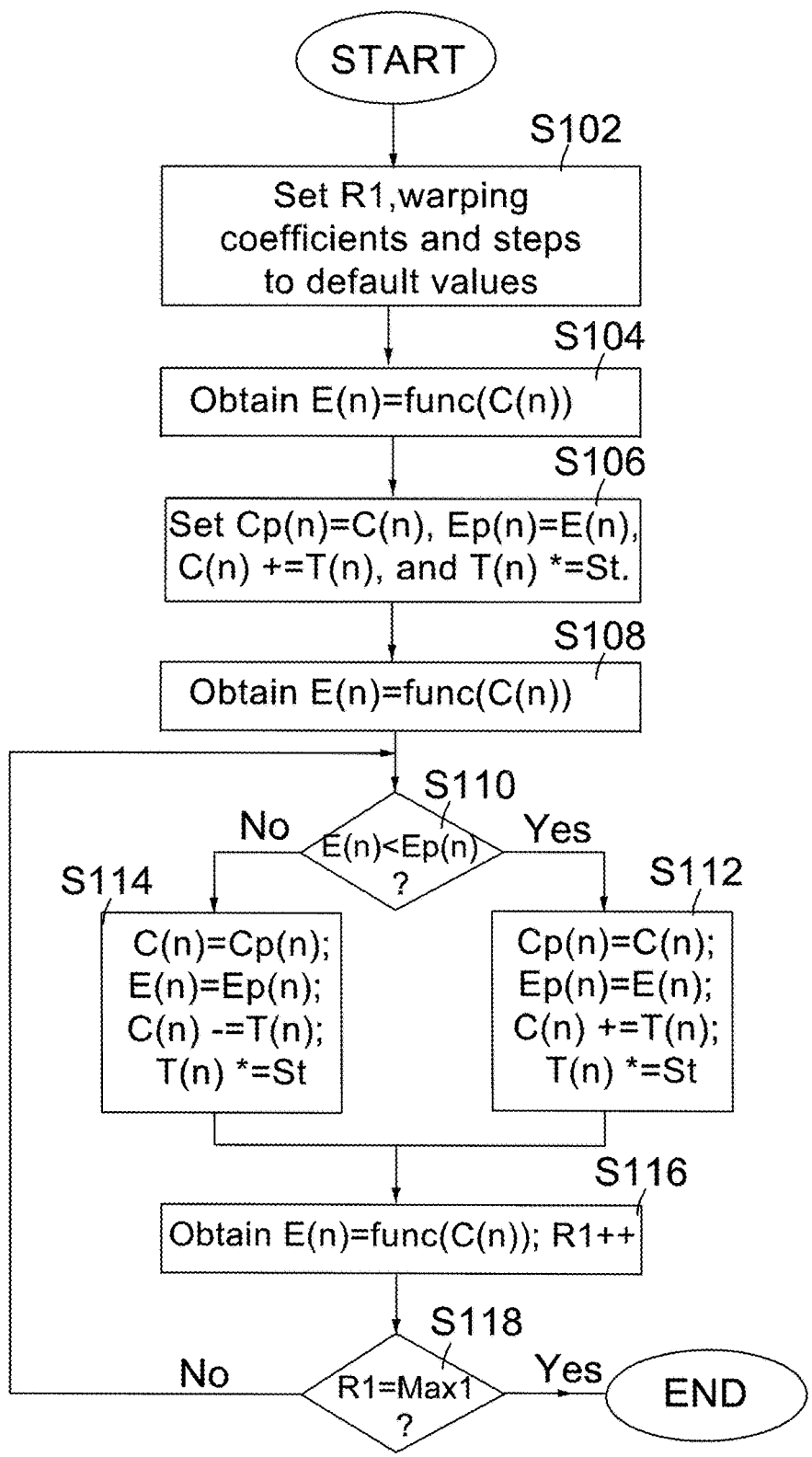
FIG. 10A is a flow chart showing operations of the optimize unit 450 using Hill-climbing search technique according to an embodiment of the invention.
Figure 10B:
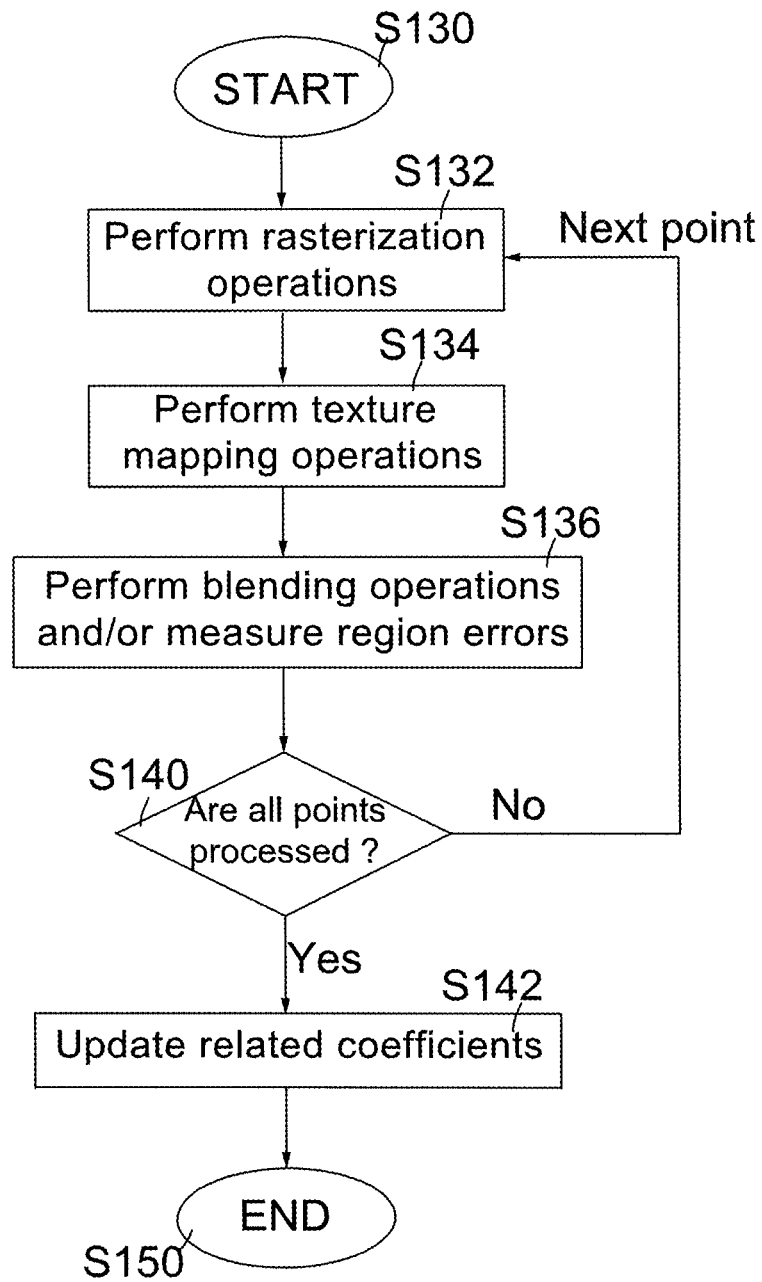
FIG. 10B is a flow chart showing an operating method of the compensation device in a mix mode according to an embodiment of the invention.
Figure 10C:
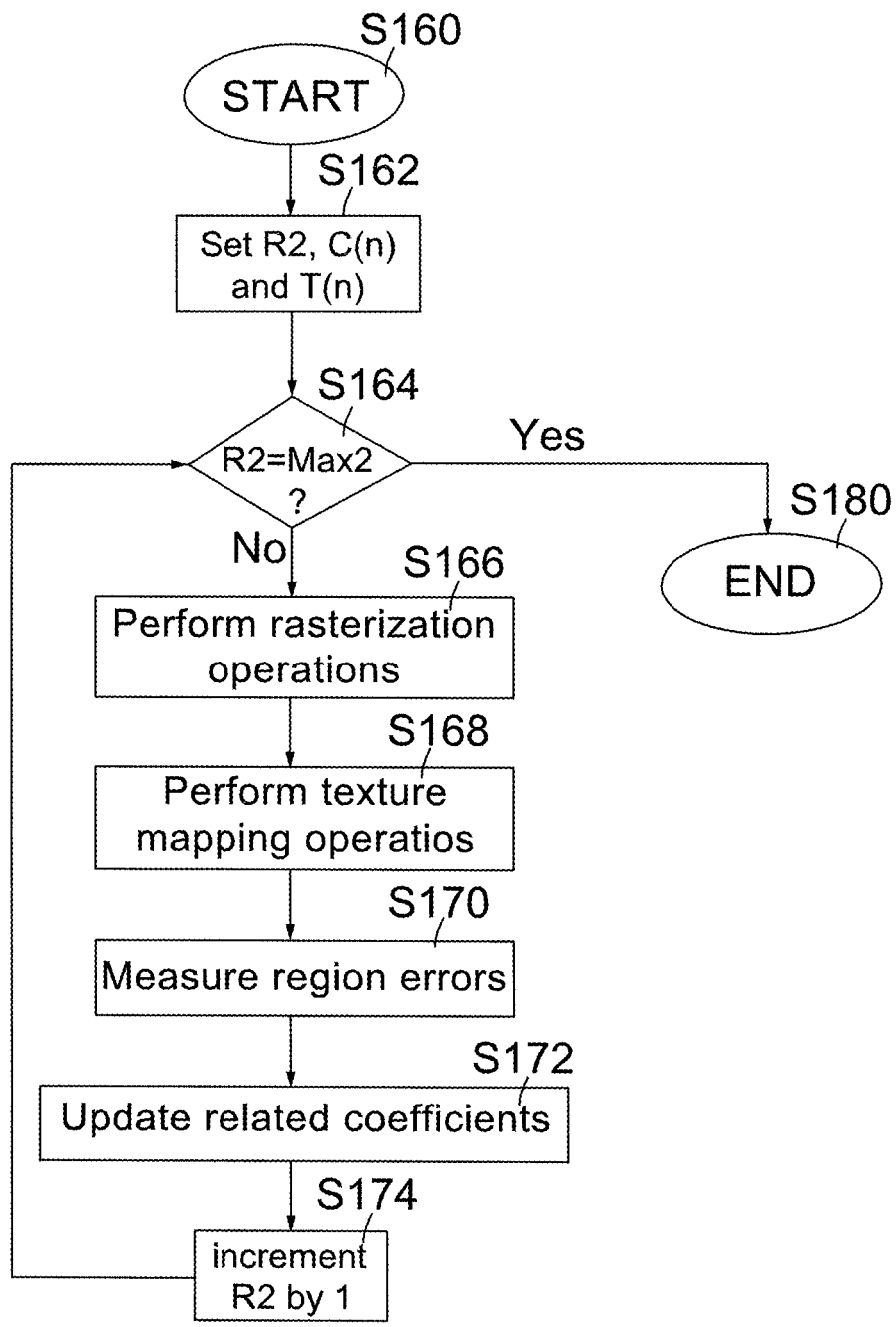
FIG. 10C is a flow chart showing an operating method of the compensation device 40 in a test mode according to an embodiment of the invention.

The compensation device 40 operates in one of a rendering mode, a test mode and a mix mode (see FIGS. 10B and 10C). After receiving the assembled vertex list and the six-face camera images, in addition to generating an equirectangular panoramic image, the image processing apparatus 430 also generates region errors E(1)~E(12) for the overlap regions R(1)~R(12) in the equirectangular panoramic image in the mix mode. The detailed operations of the image processing apparatus 430A/B generating the equirectangular panoramic images are disclosed in U.S. patent application Ser. No. 15/211,732.

Figure 8A:
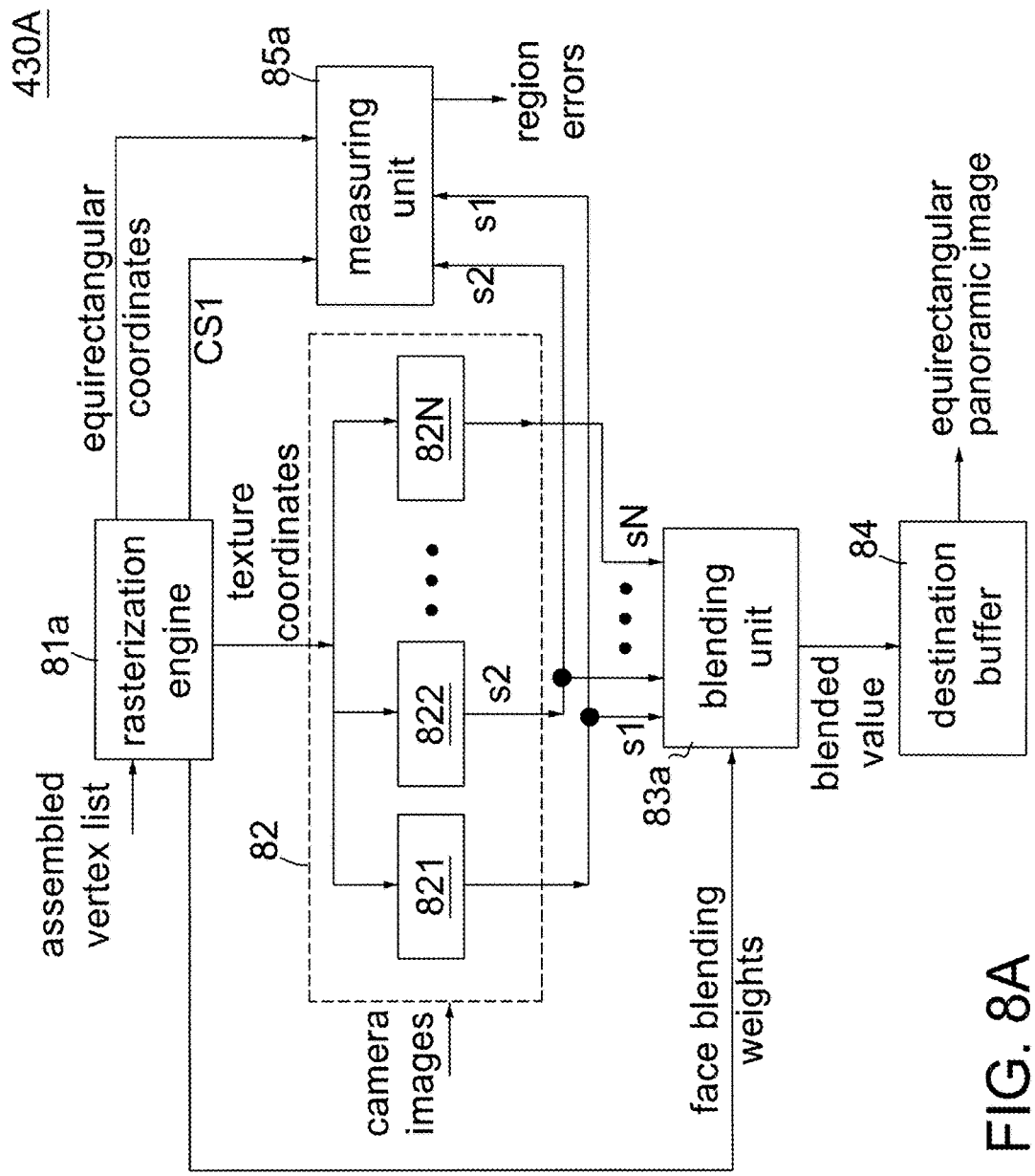
FIG. 8A is a schematic diagram showing the image processing apparatus according to one embodiment of the invention.

FIG. 8A is a schematic diagram showing the image processing apparatus according to one embodiment of the invention. Referring to FIG. 8A, the image processing apparatus 430A includes a rasterization engine 81a, a texture mapping circuit 82, a blending unit 83a, a destination buffer 84 and a measuring unit 85a. The texture mapping circuit 82 includes N number of texture mapping engines 821~82N.

In the mix mode, at first, the rasterization engine 81a receives the assembled vertex list and retrieves a group of vertices forming a polygon from the assembled vertex list at a time. Then, the rasterization engine 81a checks N number of covering/overlapping camera images in its data structure for each of the vertices forming the polygon. If N=1, the rasterization engine 81a de-asserts the control signal CS1 to disable the measuring unit 85a, otherwise, asserts the control signal CS1 to enable the measuring unit 85a. If N=2, the rasterization engine 81a performs polygon rasterization operations for the point Q (having equirectangular coordinates (x, y)) in the polygon of the polygon mesh of FIG. 5B to generate two pairs of texture coordinates and two face blending weights for two camera images. If N>2, the rasterization engine 81a performs polygon rasterization operations for the point Q (having equirectangular coordinates (x, y)) in the polygon of the polygon mesh of FIG. 5B to generate two pairs of texture coordinates and two face blending weights for two camera images arbitrarily selected from the N number of covering/overlapping camera images.

Example camera images include, with limitation, YUV color images, RGB color images, luminance images, edge images and motion vector images. As well known in the art, an edge image can be obtained by applying an edge detection operator (such as a Canny edge detector or a Sobel operator) over a normal color image; a motion vector image can be obtained by performing motion estimation using known algorithms (such as block-matching algorithm, pixel recursive algorithm or optical flow) over two consecutive camera images (such as two top-face camera images (t0) and (t1)).

For N>=2, according to the two pairs of texture coordinates, two texture mapping engines (e.g., 821 and 822 as shown in FIG. 8A) of the texture mapping circuit 82 texture map the texture data from the two camera images using any appropriate method (such as nearest-neighbour interpolation, bilinear interpolation or trilinear interpolation) to generate two sample values (s1, s2) in parallel. Here, the sample value (s1, s2) may be a luma value, a chroma value, an edge value, a pixel color value (RGB), or a motion vector. The blending unit 83a blends the two sample values (s1, s2) together to generate a blended value Vb for the point Q according to the two face blending weights, and then stores the blended value Vb of point Q into the destination buffer 84. In this manner, the blending unit 83a sequentially stores the blended values Vb into the destination buffer 84 until all the points within the polygon are processed/completed. Once all the polygons are processed, an equirectangular panoramic image is completed. On the other hand, during the process of generating the equirectangular panoramic images, the measuring unit 85a simultaneously estimates/measures region errors E(1)~E(12) for the overlap regions R(1)~R(12) in the equirectangular panoramic image according to the equirectangular coordinates (x, y) of the point Q and the two sample values (s1, s2).

In one embodiment, the operations of the image processing apparatus 430A in the mix mode are further described below with the assumption that the rasterization engine 81a retrieves three vertices forming a triangle from the assembled vertex list at a time for the middle rows (rather than the top row and the bottom row) of the polygon mesh in FIG. 5B, each of three vertices (A, B, C) of one triangle of the polygon mesh is overlapped with two-face camera images (e.g., front, top; N=2), and the three vertices (A, B, C) have the following data structures contained in the assembled vertex list: vertex A:{($x_A$, $y_A$), 0, 2, $ID_{Front}$, ($u_{1A}$, $v_{1A}$), $w_{1A}$, $ID_{Top}$, ($u_{2A}$, $v_{2A}$), $w_{2A}$}; vertex B:{($x_B$, $y_B$), 0, 2, $ID_{Front}$, ($u_{1B}$, $v_{1B}$), $w_{1B}$, $ID_{Top}$, ($u_{2B}$, $v_{2B}$)) $w_{2B}$}; vertex C:{($x_C$, $y_C$), 0, 2, $ID_{Front}$, ($u_{1C}$, $v_{1C}$), $w_{1C}$, $ID_{Top}$, ($u_{2C}$, $v_{2C}$), $w_{2C}$}. None of the vertices ABC is derived from a pole point.

Since N>1, the rasterization engine 81a asserts the control signal CS1 to enable the measuring unit 85a and then performs triangle rasterization operations for each point in triangle ABC. Specifically, the rasterization engine 81a sends the equirectangular coordinates (x, y) of the point Q to the measuring unit 85a, and computes texture coordinates and a face blending weight for each camera image based on the point Q having equirectangular coordinates (x, y) within the triangle ABC of the polygon mesh by using the following steps: 1. Compute three spatial weighting values (a,b,c) according to equirectangular coordinates ($x_A$, $y_A$, $x_B$, $y_B$, $x_C$, $y_C$, x, y) by using a barycentric weighting method. 2. compute a face blending weight $fw_1$ for a sample point $Q_F$ (corresponding to point Q) in front-face camera image: $fw_1 = a*w_{1A} + b*w_{1B} + c*w_{1C}$; compute a face blending weight $fw_2$ for a sample point $Q_T$ (corresponding to point Q) in top-face camera image: $fw_2 = a*w_{2A} + b*w_{2B} + c*w_{2C}$. 3. compute texture coordinates for the sample point $Q_F$ (corresponding to point Q) in front-face camera image: (u1,v1)= ($a*u_{1A} + b*u_{1B} + c*u_{1C}$, $a*v_{1A} + b*v_{1B} + c*v_{1C}$); compute texture coordinates for the sample point $Q_T$ (corresponding to point Q) in top-face camera image: (u2,v2)=($a*u_{2A} + b*u_{2B} + c*u_{2C}$, $a*v_{2A} + b*v_{2B} + c*v_{2C}$). Finally, the rasterization engine 81a sends the two pairs of texture coordinates (u1, v1) and (u2, v2) to the texture mapping circuit 82 in parallel. Here, a+b+c=1 and $fw_1 + fw_2 = 1$. According to the two pairs of texture coordinates (u1, v1) and (u2, v2), two texture mapping engines (e.g., 821 and 822 as shown in FIG. 8A) texture map the texture data of the two-face camera images using any appropriate method (such as nearest-neighbour interpolation, bilinear interpolation or trilinear interpolation) to generate two sample values s1 and s2, respectively. After receiving the two face blending weights ($fw_1$, $fw_2$), the blending unit 83a blends the two sample values (s1, s2) together to generate the blended value Vb of point Q using the following equation: $Vb = fw_1*s1 + fw_2*s2$. Finally, the blending unit 83a stores the blended value Vb of point Q into the destination buffer 84.

As can be seen from their data structures, each of three vertices (A, B, C) is overlapped with the front-face and top-face camera images. According to the equirectangular coordinates (x, y), the measuring unit 85a determines whether the point Q falls in one of the twelve overlap regions, such as R(3), and then starts to estimate/measure the region error of the overlap region R(3) if the point Q is determined to fall in region R(3).

The measuring unit 85a may estimate/measure the region errors for the overlap regions by using known algorithms, such as SAD (sum of absolute differences), SSD (sum of squared differences), MAD (median absolute deviation), etc. As an example, the measuring unit 85a may accumulate the absolute value of the sample value difference between each point in the overlap region R(3) of the top-face camera image and the corresponding point in the overlap region R(3) of the front-face camera image to obtain the SAD value as the region error E(3) for the overlap region R(3), by using the following equations: E=|s1−s2|; E(3)+=E. In this manner, the measuring unit 85a measures twelves region errors E(1)~E(12) for the twelve overlap regions R(1)~R(12).

In the rendering mode, the rasterization engine 81a de-asserts the control signal CS1 to disable the measuring unit 85a, and performs polygon rasterization operations for a point Q (having equirectangular coordinates (x, y)) in the polygon of the polygon mesh of FIG. 5B to generate N pairs of texture coordinates and N face blending weights for N camera images. Besides, the N number of texture mapping engines 821~82N are activated to texture map the texture data from the N camera images using any appropriate interpolation method to generate N sample values (s1, . . . , sN) in parallel. The blending unit 83a blends the N sample values (s1, . . . , sN) together to generate a blended value Vb for the point Q according to the N face blending weights ($fw_1$, . . . , $fw_N$), and then stores the blended value Vb of point Q into the destination buffer 84. In this manner, the blending unit 83a sequentially stores the blended values Vb into the destination buffer 84 until all the points within the polygon are processed/completed. Once all the polygons are processed, an equirectangular panoramic image is completed.

Figure 8B:
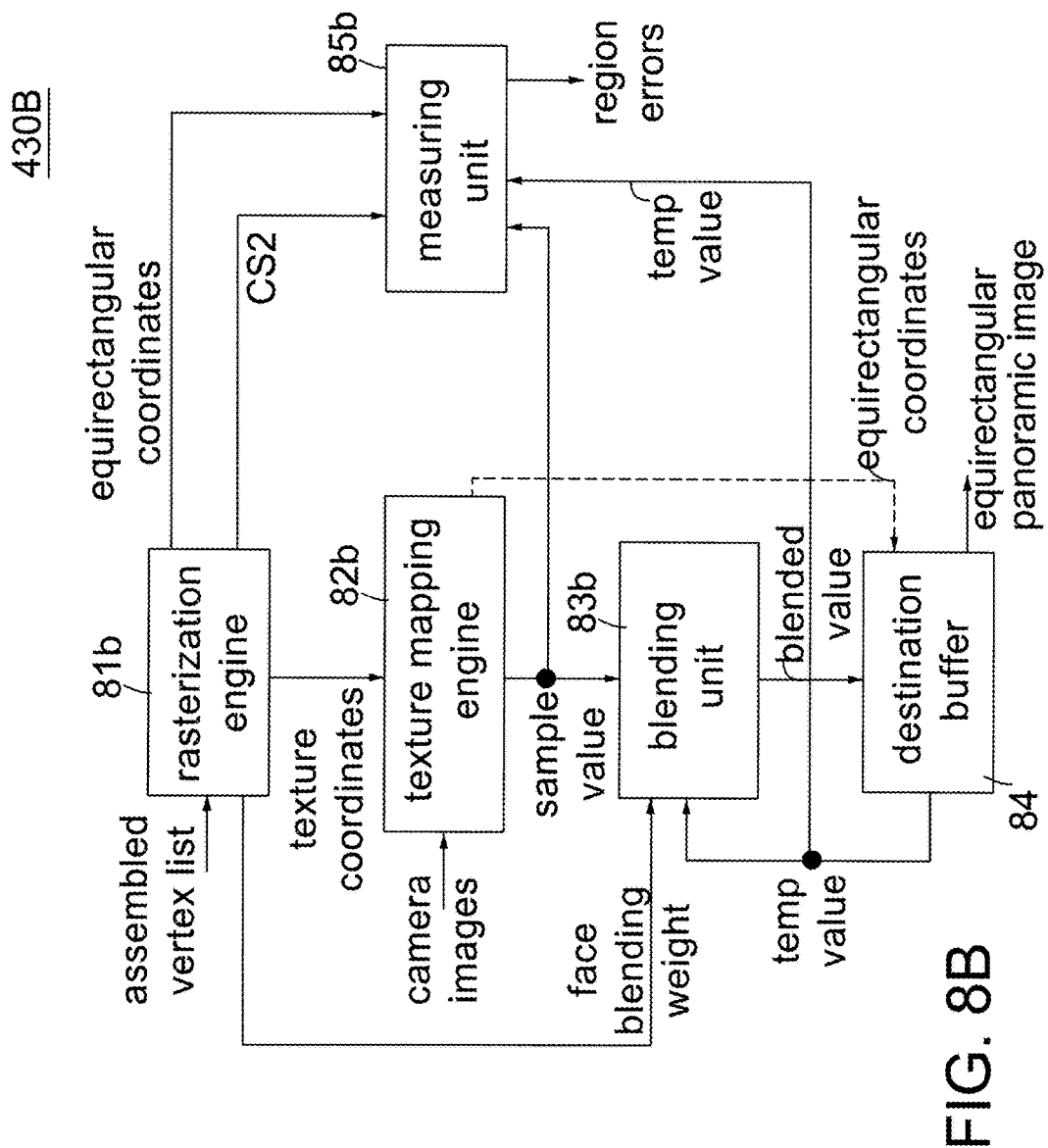
FIG. 8B is a schematic diagram showing the image processing apparatus according to another embodiment of the invention.

FIG. 8B is a schematic diagram showing the image processing apparatus according to another embodiment of the invention. Referring to FIG. 8B, the image processing apparatus 430B includes a rasterization engine 81b, a texture mapping engine 82b, a blending unit 83b, a destination buffer 84 and a measuring unit 85b. As clearly shown in FIG. 8B, there is only one texture mapping engine 82b in this embodiment. For ease of description, the operations of the image processing apparatus 430B are described below based on the above same example (the point Q having equirectangular coordinates (x, y) within the triangle ABC of the polygon mesh).

In the mix mode, most operations of the rasterization engine 81b are the same as those of the rasterization engine 81a, except that if N>1, the rasterization engine 81b sequentially sends the texture coordinates (u1, v1) and (u2, v2) to the texture mapping engine 82b and sends the two face blending weights ($fw_1$, $fw_2$) to the blending unit 83b. In other words, if N=2, the rasterization engine 81b sends one face blending weight and one pair of texture coordinates at a time (i.e., a total of two rounds/times) after computing the two face blending weights ($fw_1$, $fw_2$) and the two pairs of texture coordinates (u1, v1) and (u2, v2) for two camera images. If N>2, the rasterization engine 81b sends one face blending weight and one pair of texture coordinates at a time (i.e., a total of two rounds/times) after computing the two face blending weights ($fw_1$, $fw_2$) and the two pairs of texture coordinates (u1, v1) and (u2, v2) for two camera images arbitrarily selected from the N number of covering/overlapping camera images. Then, the texture mapping engine 82b needs to perform the following operations two rounds, i.e., receiving the texture coordinates, texture mapping the texture data of one camera image to generate one sample value, and then sending its sample value to the blending unit 83b. Next, the blending unit 83b also stores two rounds according to the two sample values (s1, s2) and the two face blending weights ($fw_1$, $fw_2$). Specifically, in the first round, the blending unit 83b receives the sample value s1, and then stores the s1 in the destination buffer 84. In the second round, the blending unit 83b fetches the temp value s1 from the destination buffer 84, receives the sample value s2 and the face blending weight $fw_2$, obtains the blended value Vb by computing the equation: $Vb = fw_1*s1 + fw_2*s2$, and then stores the blended value Vb in the destination buffer 84. Here, $fw_1 + fw_2 = 1$. Please note that the temp value s1 is also sent to the measuring unit 85b. In this manner, the blending unit 83b sequentially stores the blended value Vb in the destination buffer 84 for each point/pixel until all the points within the triangle ABC are processed/completed. Once all the quadrilateral/triangles are processed, the equirectangular panoramic image is completed.

According to the equirectangular coordinates (x, y), the measuring unit 85b determines whether the point Q falls in one of the twelve overlap regions, such as R(3), and then starts to measure the region error of the overlap region R(3) if the point Q is determined to fall in region R(3). For example, the measuring unit 85b may accumulate the absolute value of the sample value difference between each point in the overlap region R(3) of the top-face camera image and the corresponding point in the overlap region R(3) of the front-face camera image to obtain the SAD value as the region error E(3) for the overlap region R(3), by using the following equations: E=|s2−s1|; E(3)+=E. In this manner, the measuring unit 85b measures twelves region errors E(1)~E(12) for the twelve overlap regions R(1)~R(12).

In the rendering mode, the rasterization engine 81b de-asserts the control signal CS1 to disable the measuring unit 85b, performs polygon rasterization operations for a point Q (having equirectangular coordinates (x, y)) in the polygon of the polygon mesh of FIG. 5B to generate N pairs of texture coordinates and N face blending weights for N camera images, and sequentially sends the N pairs of texture coordinates to the texture mapping engine 82b and sends the N face blending weights to the blending unit 83b. Then, the texture mapping engine 82b needs to perform the following operations N rounds, i.e., receiving the texture coordinates, texture mapping the texture data of one camera image to generate one sample value, and then sending its sample value to the blending unit 83b. Next, the blending unit 83b stores N rounds according to the N sample values (s1, . . . , sN) and the N face blending weights (fw$_1$, . . . , fw$_N$), and then obtains the blended value Vb by computing the equation: Vb=fw$_1$*s1+ . . . +fw$_N$*sN. Finally, the blending unit 83b stores the blended value Vb in the destination buffer 84. Here, fw$_1$+ . . . +fw$_N$=1. In this manner, the blending unit 83b sequentially stores the blended value Vb in the destination buffer 84 for each point/pixel until all the points within the polygon processed/completed. Once all the polygons are processed, the equirectangular panoramic image is completed.

In one embodiment, the operations of the image processing apparatus 430A in the mix mode are further described below with the assumption that the rasterization engine 81a retrieves a group of four vertices forming a quadrilateral from the assembled vertex list at a time for the top row and the bottom row of the polygon mesh in FIG. 5B, each of four vertices (A, B, C', D) of one quadrilateral of the polygon mesh is overlapped with two-face camera images (e.g., front, top), and the four vertices (A, B, C', D) have the following data structures contained in the assembled vertex list: vertex A:{($x_A$, $y_A$), 0, 2, $ID_{Front}$, ($u_{1A}$, $v_{1A}$), $w_{1A}$, $ID_{Top}$, ($u_{2A}$, $v_{2A}$), $w_{2A}$}; vertex B:{($x_B$, $y_B$), 0, 2, $ID_{Front}$, ($u_{1B}$, $v_{1B}$), $w_{1B}$, $ID_{Top}$, ($u_{2B}$, $v_{2B}$), $w_{2B}$}; vertex C':{($x_C$, $y_C$), 1, 2, $ID_{Front}$, ($u_{1C}$, $v_{1C}$), $w_{1C}$, $ID_{Top}$, $v_{2C}$), $w_{2C}$}, vertex D:{($x_D$, $y_D$), 1, 2, $ID_{Front}$, ($u_{1D}$, $v_{1D}$), $w_{1D}$, $ID_{Top}$, ($u_{2D}$, $v_{2D}$)}. The vertices C' and D are derived from pole point(s).

The rasterization engine 81a performs quadrilateral rasterization operations for each point of quadrilateral ABC'D. Specifically, the rasterization engine 81a sends the equirectangular coordinates (x, y) of the point Q to the measuring unit 85a, and computes texture coordinates and a face blending weight for each camera image based on the point Q having equirectangular coordinates (x, y) within the quadrilateral ABC'D of the polygon mesh by using the following steps: 1. Compute four spatial weighting values (a,b,c,d) according to equirectangular coordinates ($x_A$, $y_A$, $x_B$, $y_B$, $x_C$, $y_C$, $x_D$, $y_D$, x, y) by using a bi-linear interpolation method. 2. compute a face blending weight fw$_1$ for a sample point $Q_F$ (corresponding to point Q) in front-face camera image: fw$_1$=a*$w_{1A}$+b*$w_{1B}$+c*$w_{1C}$+d*$w_{1D}$; compute a face blending weight fw$_2$ for a sample point $Q_T$ (corresponding to point Q) in top-face camera image: fw$_2$=a*$w_{2A}$+b*$w_{2B}$+c*$w_{2C}$+d*$w_{1D}$. 3. compute texture coordinates for the sample point $Q_F$ (corresponding to point Q) in front-face camera image: (u1,v1)=(a*$u_{1A}$+b*$u_{1B}$+c*$u_{1C}$+d*$u_{1D}$, a*$v_{1A}$+b*$v_{1B}$+c*$v_{1C}$+d*$v_{1D}$); compute texture coordinates for the sample point $Q_T$ (corresponding to point Q) in top-face camera image: (u2,v2)=(a*$u_{2A}$+b*$u_{2B}$+c*$u_{2C}$+d*$u_{1D}$, a*$v_{2A}$+b*$v_{2B}$+c*$v_{2C}$+d*$v_{1D}$). Finally, the rasterization engine 81a sends the two pairs of texture coordinates (u1, v1) and (u2, v2) to the texture mapping engines 82a~82b in parallel. Here, a+b+c+d=1 and fw$_1$+fw$_2$=1. No matter how many vertices are received from the assembled vertex list at a time by the rasterization engine 81a, the texture mapping engines 82a~82b, the blending unit 83a and the measuring unit 85a perform the same operations.

In an alternative embodiment, the original vertex list is divided into six original surface vertex lists respectively corresponding to the six camera images, the adjusted vertex list is divided into six adjusted surface vertex lists respectively corresponding to the six camera images, and the assembled vertex list is divided into six assembled surface vertex lists respectively corresponding to the six camera images. Each original/adjusted/assembled surface vertex list is a list of a plurality of vertices covered by a corresponding camera image and each vertex is defined by its corresponding data structure. The data structure defines a vertex mapping between a destination space and a texture space (or between the equirectangular coordinates and the texture coordinates of one camera image). In one embodiment, the data structure includes, without limitation, equirectangular coordinates, a pole flag, texture coordinates in the corresponding camera image, ID for the corresponding camera image and a blending weight for the corresponding camera image. Table 2 shows an exemplary data structure of for each vertex in each original/assembled/adjusted surface vertex list.

TABLE 2

| Attributes | Descriptions |
| --- | --- |
| (x, y) | Equirectangular coordinates |
| Pole flag | Indicate whether the vertex is a pole point(e.g., 1: pole point; 0: not pole point) |
| ID | ID of a corresponding camera image |
| (u, v) | Texture coordinates in first camera image |
| w | Default blending weight for the corresponding camera image |

In this embodiment, the six surface original vertex lists are generated by the correspondence generator 15 and sequentially sent to the vertex processing device 410. Please note that the six assembled surface vertex lists are applicable to the image processing apparatus 430B only, but not to the image processing apparatus 430A. Since there are six original/adjusted/assembled surface vertex lists, the vertex processing device 410, the primitive assemble unit 420, the image processing apparatus 430B and the optimizing unit 450 perform their operations over the six camera images six rounds.

For ease of description, the operations of the image processing apparatus 430B in the mix mode are described with six assembled surface vertex lists based on the above same example (the point Q having equirectangular coordinates (x, y) within the triangle ABC of the polygon mesh; each of three vertices (A, B, C) is overlapped with the front-face and top-face camera images). In the first round, after receiving a front-face assembled vertex list, the rasterization engine 81b computes all texture coordinates (including (u1, v1)) for all points (including point Q) according to the vertices from the front-face assembled vertex list, and sequentially sends the texture coordinates to the texture mapping engine 82. According to the texture coordinates (including (u1, v1)), the texture mapping engines 82b sequentially texture-maps the texture data of the front-face camera image using any appropriate method (such as nearest-neighbour interpolation, bilinear interpolation or trilinear interpolation) to generate the sample values (including s1). Then, the blending unit 83b directly stores the sample values (including s1) associated with the front-face camera image in destination buffer 84. In the second round, after receiving a top-face assembled vertex list, the rasterization engine 81b computes all the face blending weights (including $fw_2$) and all texture coordinates (including (u2, v2)) for all points (including point Q) according to the vertices from the top-face assembled vertex list, sequentially sends the face blending weights to the blending unit 83b and sends the texture coordinates and equirectangular coordinates (including (x, y) for point Q) to the texture mapping engine 82b. According to the texture coordinates, such as (u2, u2) for point Q, the texture mapping engines 82b texture-maps the texture data of the top-face camera image using any appropriate method to generate a sample value s2. Meanwhile, the texture mapping engines 82b sends sample value s2 to the blending unit 83b and the measuring unit 85b and sends the equirectangular coordinates, such as (x, y) for point Q, to the destination buffer 84. In response to the equirectangular coordinates (x, y), the destination buffer 84 fetches the sample value s1 corresponding to point Q and outputs it as the temp value. After receiving the sample value s2 and the face blending weight $fw_2$, the blending unit 83b obtains the blended value Vb by computing the equation: $Vb=(1-fw_2)*s1+fw_2*s2$, and then stores the blended value Vb in the destination buffer 84. In this manner, the blending unit 83b sequentially stores the blended value Vb in the destination buffer 84 for each point/pixel until all the points within the triangle ABC are processed/completed. On the other hand, the temp value s1 from the destination buffer 84 is also inputted into the measuring unit 85b. Then, the measuring unit 85b obtains the absolute value of the sample value difference for point Q by calculating E=|s2−s1|. In this manner, the measuring unit 85b accumulates the absolute value of the sample value difference between each point in the overlap region R(3) of the top-face camera image and the corresponding point in the overlap region R(3) of the front-face camera image to obtain the SAD value as the region error E(3) for the overlap region R(3), by using the following equations: E=|s2−s1|; E(3)+=E.

Figure 9A:
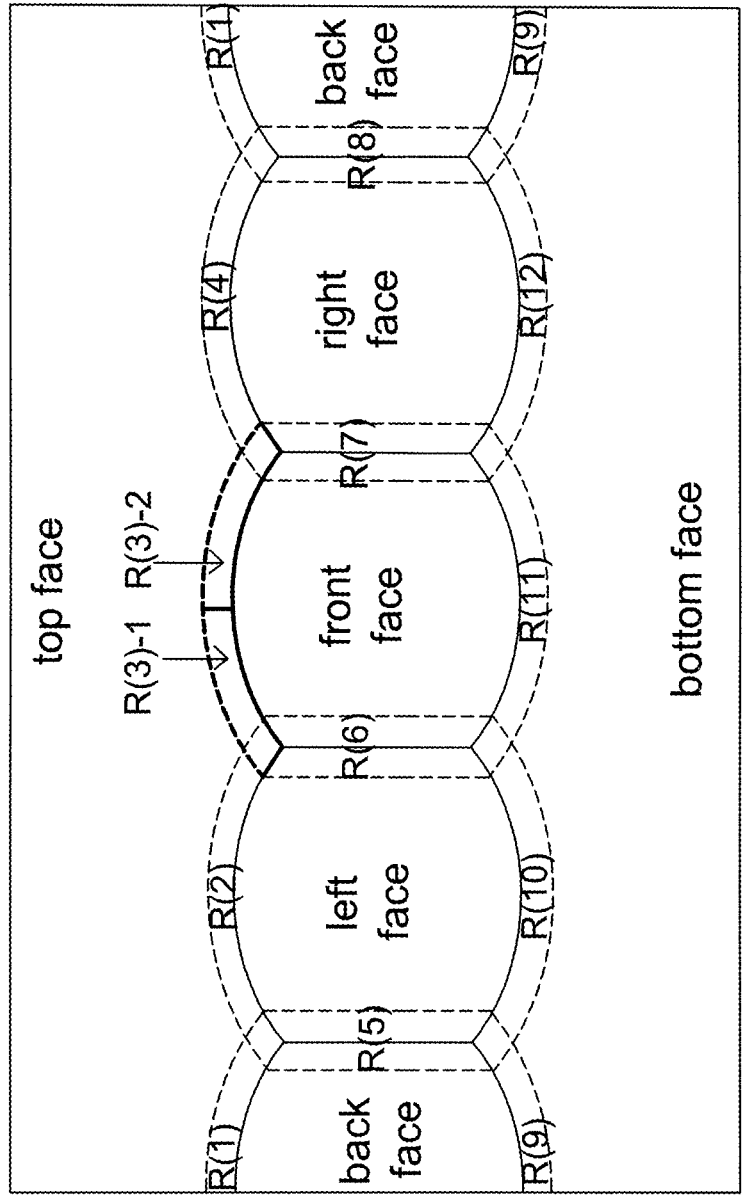
FIG. 9A is an example showing the overlap region R(3) is divided into two sub-regions R(3)-1 and R(3)-2.
Figure 9B:
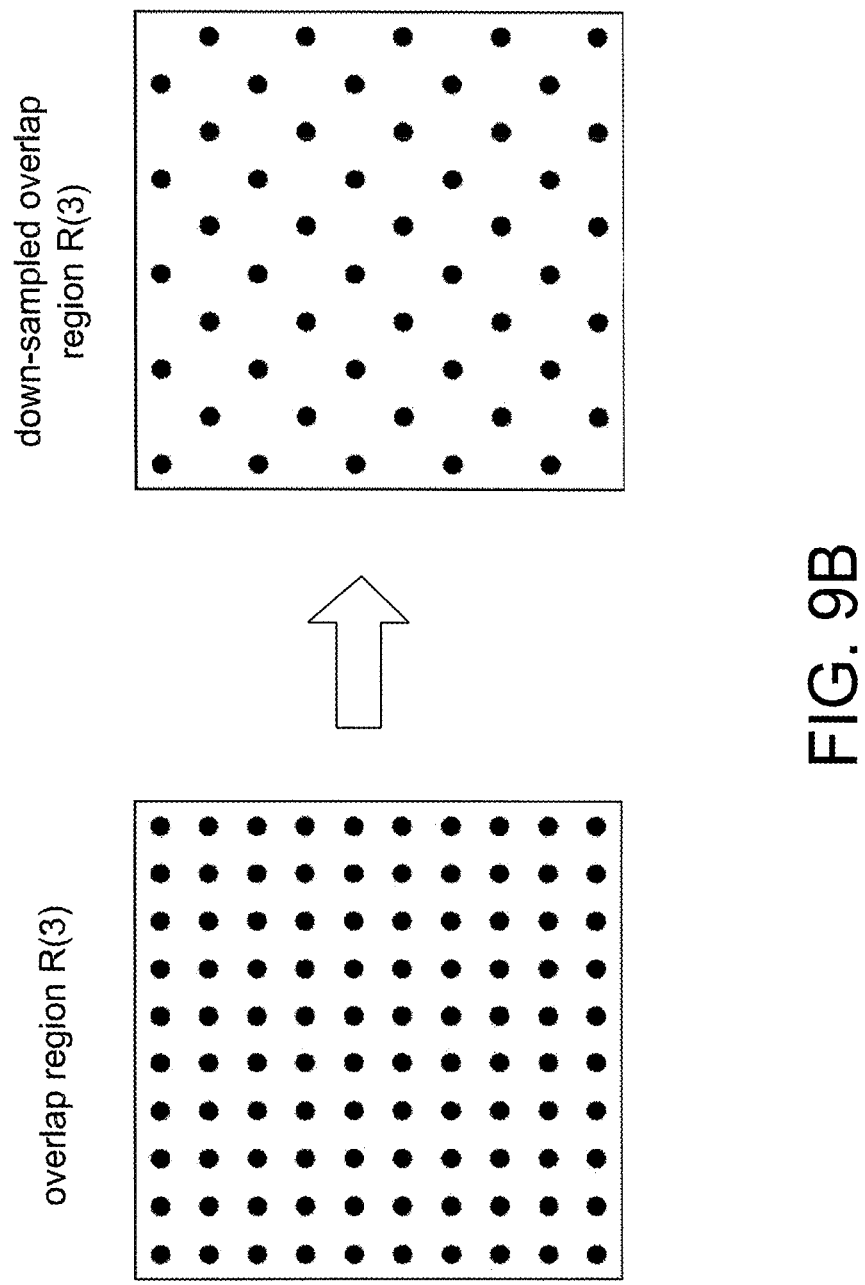
FIG. 9B is an example showing the points in the overlap region R(3) are down-sampled by G (=2).

In an alternative embodiment, for better stitching quality, the image processing apparatus 430A/B may divide any one of the twelve overlap regions R(1)~R(12) into at least two sub-regions. FIG. 9A is an example showing the overlap region R(3) is divided into two sub-regions R(3)-1 and R(3)-2. In the example of FIG. 9A, the measuring unit 85a/b needs to measure thirteen region errors E(1)~E(2), E(3)-1, E(3)-2 and E(4)~E(12) for the thirteen overlap regions R(1)~R(2), R(3)-1, R(3)-2 and R(4)~R(12). Accordingly, the optimize unit 450 needs to generate thirteen warping coefficients C(1)~C(2), C(3)-1, C(3)-2 and C(4)~C(12) according to the thirteen region errors E(1)~E(2), E(3)-1, E(3)-2 and E(4)~E(12). In another alternative embodiment, to reduce the processing time or the computation load, the measuring unit 85a/b may accumulate the sample value difference between every $G^{th}$ point in a specified overlap region of a first camera image and the corresponding point in the specified overlap region of a second camera image to obtain its region error, e.g., by controlling the equirectangular coordinates (every $G^{th}$ point) from the rasterization engine 81a/b. FIG. 9B is an example showing the points in the overlap region R(3) are down-sampled by G (=2). Referring to FIG. 9B, the measuring unit 85a/b may accumulate the sample value difference between every 2nd point in the overlap region R(3) of the top-face camera image and the corresponding point in the overlap region R(3) of the front-face camera image to obtain its SAD value as the region error. According to the example of FIG. 9B, the processing time or the computation load for calculating the region error is reduced by one half.

Referring back to FIG. 4A, the optimize unit 450 sends default warping coefficients C(1)~C(12) (e.g., each equals to 1) to the vertex processing device 410 upon power up. Afterward, after receiving the region errors E(1)~E(12) from the image processing apparatus 430A/B, the optimize unit 450 modifies its previous warping coefficients Cp(1)~Cp(12) by using an optimization algorithm to minimize region errors, and finally sends current warping coefficients C(1)~C(12) to the vertex processing device 410. Example optimization algorithms include, without limitation, Hill-climbing search technique.

FIG. 10A is a flow chart showing operations of the optimize unit 450 using Hill-climbing search technique according to an embodiment of the invention. Hereinafter, the operations of the optimize unit 450 are described with reference to FIGS. 4A and 10A.

Step S102: Respectively set the R1 number of iterations, current warping coefficients C(1)~C(n) and steps T(1)~T(n) to their default values upon power up. In one embodiment, set the R1 number of iterations to 0, all the current warping coefficients C(n) to 1 and all the steps T(n) to 0.05, for n=1, 2, . . . , 12.

Step S104: Measure/obtain current region errors E(1)~E(n) for overlap regions R(1)~R(n) in the equirectangular panoramic image (as shown in FIG. 6A) by the image processing apparatus 430A/B after the operations of the vertex processing device 410, the primitive assemble unit 420 and the image processing apparatus 430A/B are done base on the current warping coefficients C(1)~C(n) from Step S102. For ease of description, this step S104 is denoted by E(n)=func(C(n)), for n=1, 2, . . . , 12, and func( ) denotes the combinational operations of the vertex processing device 410, the primitive assemble unit 420 and the image processing apparatus 430A/B.

Step S106: Update previous warping coefficients Cp(n), previous region errors Ep(n), the current warping coefficients C(n) and the steps T(n) based on the current region errors E(n), for n=1, 2, . . . , 12. In one embodiment, Cp(n)=C(n), Ep(n)=E(n), C(n)+=T(n), and T(n)*=St, for n=1, 2, . . . , 12. Here, the parameter Std denotes a step decrease equal to 0.95.

Step S108: Measure/obtain the current region errors E(n) for overlap regions R(n) in the equirectangular panoramic image (as shown in FIG. 6A) by the image processing apparatus 430A/B after the operations of the vertex processing device 410, the primitive assemble unit 420 and the image processing apparatus 430A/B are done base on the current warping coefficients C(n) from Step S106. That is, E(n)=func(C(n)), for n=1, 2, . . . , 12.

Step S110: Determine whether the current region errors E(n) are less than the previous region errors Ep(n), for n=1, 2, . . . , 12. If YES, the flow goes to Step S112; otherwise, the flow goes to Step S114.

Step S112: Update the previous warping coefficients Cp(n), the previous region errors Ep(n), the current warping coefficients C(n) and the steps T(n), for n=1, 2, . . . , 12. Specifically, set Cp(n)=C(n), Ep(n)=E(n), C(n)+=T(n), and T(n)*=St, for n=1, 2, . . . , 12. Here, in comparison with its previous step (e.g., Step S106), because the current region errors E(n) are decreasing, it indicates updating the current warping coefficients C(n) goes in right direction and then keeps increasing.

Step S114: Update the previous warping coefficients Cp(n), the previous region errors Ep(n), the current warping coefficients C(n) and the steps T(n) based on the current region errors E(n), for n=1, 2, . . . , 12. Specifically, set C(n)=Cp(n), Ep(n)=E(n), C(n)−=T(n), and T(n)*=Std, for n=1, 2, . . . , 12. Here, in comparison with its previous step (e.g., Step S106), because the current region errors E(n) are increasing, it indicates updating the current warping coefficients C(n) goes in the wrong direction and then should turn increasing into decreasing.

Step S116: Measure/obtain the current region errors E(n) for overlap regions R(n) in the equirectangular panoramic image (as shown in FIG. 6A) by the image processing apparatus 430A/B after the operations of the vertex processing device 410, the primitive assemble unit 420 and the image processing apparatus 430A/B are done base on the current warping coefficients C(n) from Step S112/114. That is, E(n)=func(Cn), for n=1, 2, . . . , 12. Here, the R1 number of iterations is incremented by 1.

Step S118: Determine whether the R1 number of iterations reaches a limit Max1. If YES, the flow is terminated; otherwise, the flow goes to Step S110.

FIG. 10B is a flow chart showing an operating method of the compensation device 40 in a mix mode according to an embodiment of the invention. Hereinafter, the operating method of the compensation device 40 in a mix mode is described with reference to FIGS. 4A and 10B.

Step S130: A frame starts. It indicates six camera images are captured at a time and outputted from image capture module 11.

Step S132: Perform rasterization operations. In one embodiment, perform polygon rasterization operations by the rasterization engine 81a/b for the point Q (having equirectangular coordinates (x, y)) in the polygon of the polygon mesh of FIG. 5B to generate two pairs of texture coordinates and two face blending weights for two of the six camera images, if N>=2.

Step S134: Perform texture-mapping operations. In one embodiment, according to the two pairs of texture coordinates, texture map the texture data from the two camera images by the texture mapping circuit 82/82b using any appropriate interpolation method to generate two sample values.

Step S136: Perform blending operations and/or measure/obtain the current region errors E(1)~E(n) for overlap regions R(1)~R(n) in the equirectangular panoramic image. In one embodiment, blend the two sample values together by the blending unit 83a/b to generate a blended value for the point Q according to the two face blending weights, and then the blended value stored into the destination buffer 84. In one embodiment, if the point Q belongs to one of overlap regions R(1)~R(n), measure/obtain the current region errors E(1)~E(n) for overlap regions R(1)~R(n) in the equirectangular panoramic image by the measuring unit 85a/b after the operations of the vertex processing device 410, the primitive assemble unit 420 and the image processing apparatus 430A/B are done base on the current warping coefficients C(1)~C(n) from its previous frame. That is, E(n)=fun(C(n)), for n=1, 2, . . . , 12.

Step S140: Determine whether all points of all polygons are processed. If No, the flow goes to step S132 to process the next point; otherwise, the flow goes to step S142.

Step S142: Update related coefficients based on the current region errors E(1)~E(n). In one embodiment, update related coefficients based on the current region errors E(1)~E(n) by the optimize unit 450. Example related coefficients include, without limitation, the previous warping coefficients Cp(1)~Cp(n), the previous region errors Ep(1)~Ep(n), the current warping coefficients C(1)~C(n) and the steps T(1)~T(n), for n=1, 2, . . . , 12. Please refer to steps S112, S114.

Step S150: A frame ends. It indicates the above six camera images in step S130 are processed, its corresponding equirectangular panoramic image is outputted from the destination buffer 84 and related coefficients are updated.

FIG. 10C is a flow chart showing an operating method of the compensation device 40 in a test mode according to an embodiment of the invention. Hereinafter, the operating method of the compensation device 40 in a test mode is described with reference to FIGS. 4A and 10C.

Step S160: A frame starts. It indicates six camera images are captured at a time and outputted from image capture module 11.

Step S162: Respectively set the R2 number of iterations, current warping coefficients C(1)~C(n) and steps T(1)~T(n) by the optimize unit 450 to their default values upon power up. In one embodiment, upon power up, set the R2 number of iterations to 0, set all the current warping coefficients C(n) to 1 and all the steps T(n) to 0.05, for n=1, 2, . . . , 12.

Step S164: Determine whether the R2 number of iterations reaches a limit Max2 by the optimize unit 450. If YES, the flow is terminated; otherwise, the flow goes to Step S163.

Step S166: Perform rasterization operations. In one embodiment, perform polygon rasterization operations by the rasterization engine 81a/b for the point Q (having equirectangular coordinates (x, y)) in the polygon of the polygon mesh of FIG. 5B to generate two pairs of texture coordinates and two face blending weights for two of the six camera images, if N>=2.

Step S168: Perform texture-mapping operations. In one embodiment, according to the two pairs of texture coordinates, texture map the texture data from the two camera images by the texture mapping circuit 82/82b using any appropriate interpolation method to generate two sample values.

Step S170: Measure/obtain the current region errors E(1)~E(n) for overlap regions R(1)~R(n) in the panoramic image. In one embodiment, measure/obtain the current region errors E(1)~E(n) for overlap regions R(1)~R(n) in the equirectangular panoramic image by the measuring unit 85a/b after the operations of the vertex processing device 410, the primitive assemble unit 420 and the image processing apparatus 430A/B are done base on the current warping coefficients C(1)~C(n) from its previous iteration. That is, E(n)=fun(C(n)), for n=1, 2, . . . , 12.

Step S172: Update related coefficients based on the current region errors E(1)~E(n). In one embodiment, update related coefficients based on the current region errors E(1)~E(n) by the optimize unit 450. Example related coefficients include, without limitation, the previous warping coefficients Cp(1)~Cp(n), the previous region errors Ep(1)~Ep(n), the current warping coefficients C(1)~C(n) and the steps T(1)~T(n), for n=1, 2, . . . , 12. Please refer to steps S112, S114.

Step S174: Increment the R2 number of iterations by one by the optimize unit 450.

Step S180: A frame ends. It indicates the above six camera images in step S160 are processed and its related coefficients are optimized. Please note that due to the fact no blending operations are performed, no panoramic images are outputted in the test mode. By comparison, in the rendering mode, the measuring unit 85*a/b* are disabled, so no region errors E(1)~E(n) are outputted and no related coefficients are updated; the vertex processing device 410, the primitive assemble unit 420 and the image processing apparatus 430A/B operates base on the same current warping coefficients C(1)~C(n); the equirectangular panoramic images are sequentially outputted. In a special case that all the overlap regions R(1)~R(12) are regarded as one overlap region in FIG. 6A or two fish-eye images have only one overlap region, the measuring unit 85*a/b* needs to measure only one region error, such as E(1), for the one overlap region by using known algorithms, such as SAD, SSD, MAD, etc. As an example, the measuring unit 85*a/b* may accumulate the absolute value of the sample value difference between each point in an overlap region of a first image and the corresponding point in the overlap region of a second image to obtain the SAD value as the region error E(1) for the one overlap region, by using the following equations: E=|s1−s2|; E(1)+=E. Then, the optimizing unit 450 generates a corresponding warping coefficient C(1) according to the region error E(1). In this special case, no matter what original texture coordinates (U1, V1) of the target vertex P1 are, the coefficient interpolation unit 411 always generates an interpolated warping coefficient C' equal to C(1). The coordinate modifying unit 422 still calculates modified texture coordinates (U1', V1') in a specified camera image for the target vertex P1 according to the following equations:

$$U1'=(U1-U_{center})*C'+U_{center}; V1'=(V1-V_{center})*C'+V_{center}.$$

The compensation device 40 according to the invention may be hardware, software, or a combination of hardware and software (or firmware). An example of a pure solution would be a field programmable gate array (FPGA) design or an application specific integrated circuit (ASIC) design. In a preferred embodiment, the vertex processing device 410, the primitive assemble unit 420 and an image processing apparatus 430A/B are implemented with a graphics processing unit (GPU) and a first program memory; the optimize unit 450 is implemented with a general-purpose processor and a second program memory. The first program memory stores a first processor-executable program and the second program memory stores a second processor-executable program. When the first processor-executable program is executed by the GPU, the GPU is configured to function as: the vertex processing device 410, the primitive assemble unit 420 and an image processing apparatus 430A/B. When the second processor-executable program is executed by the general-purpose processor, the general-purpose processor is configured to function as: the optimize unit 450.

In an alternative embodiment, the compensation device 40 is implemented with a general-purpose processor and a third program memory. The third program memory stores a third processor-executable program. When the third processor-executable program is executed by the general-purpose processor, the general-purpose processor is configured to function as: the vertex processing device 410, the optimize unit 450, the primitive assemble unit 420 and an image processing apparatus 430A/B.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A vertex processing device applied in an image processing system having an image capture module that generates a plurality of camera images, comprising:
    a coefficient interpolation unit for generating an interpolated warping coefficient for each camera image with respect to each vertex from a vertex list based on n number of warping coefficients and its original texture coordinates in each camera image; and
    a coordinate modifying unit coupled to coefficient interpolation unit for calculating modified texture coordinates in each camera image for each vertex according to the interpolated warping coefficient and its original texture coordinates in each camera image;
    wherein the vertex list comprises a plurality of vertices with their data structures that define a vertex mapping between the camera images and a panoramic image; and
    wherein the n number of warping coefficients respectively denote warping degrees for n number of overlap regions in the panoramic image and n>=1.

2. The device according to claim 1, wherein if n=1, the interpolated warping coefficient is equal to the single warping coefficient.

3. The device according to claim 1, wherein if n>=2, the coefficient interpolation unit generates the interpolated warping coefficient for each camera image in relation to a target vertex by performing interpolation operations over warping coefficients of a plurality of adjacent overlap regions with respect to the original texture coordinates of the target vertex in each camera image.

4. The device according to claim 3, wherein when the number of adjacent overlap regions is equal to two, the coefficient interpolation unit calculates the interpolated warping coefficient for a specified camera image according to the following equation:

$$C'=C2*\theta1/(\theta1+\theta2)+C1*\theta2/(\theta1+\theta2); \text{ and}$$

wherein C' denotes the interpolated warping coefficient, C1 denotes a first warping coefficient of a first overlap region from the two adjacent overlap regions, C2 denotes a second warping coefficient of a second overlap region from the two adjacent overlap regions, θ1 denotes a first angle between a first vector from the center of the specified camera image to the location of the first overlap region and a second vector from the center of the specified camera image to the target vertex, and θ2 denotes a second angle between the second vector and a third vector from the center of the specified camera image to the location of the second overlap region.

5. The device according to claim 1, wherein the coordinate modifying unit calculates the modified texture coordinates of a target vertex for a specified camera image according to the following equation:

$$U1'=(U1-U_{center})*C'+U_{center}; V1'=(V1-V_{center})*C'+V_{center};$$

wherein (U1', V1') denotes the modified texture coordinates of the target vertex, (U1, V1) denotes the original texture coordinates of the target vertex, C' denotes the interpolated warping coefficient, and ($U_{center}$, $V_{center}$) denotes texture coordinates of the center of the specified camera image.

6. The device according to claim 5, wherein after the specified camera image is mapped to the panoramic image, an expansion image effect is created if C'<1, and a shrink image effect is created wherein if C'>1.

7. The device according to claim 1, wherein the vertex list is one of an original vertex list and an original surface vertex list from a calibration device, and wherein the original vertex list is divided into a plurality of original surface vertex lists.

8. An image processing system for receiving a first vertex list from a calibration device and generating a panoramic image, comprising:
an image capture module for generating a plurality of camera images;
a vertex processing device for modifying all the texture coordinates for all vertices from the first vertex list based on n number of warping coefficients to generate a second vertex list;
an image processing apparatus for selectively forming the panoramic image according to the camera images and the second vertex list, and for measuring n number of region errors for n number of overlap regions in the panoramic image; and
an optimizing unit for generating the n number of warping coefficients according to the n number of region errors;
wherein the vertex processing device comprises:
a coefficient interpolation unit for generating an interpolated warping coefficient for each camera image with respect to each vertex from the first vertex list based on the n number of warping coefficients and its original texture coordinates of the vertex in each camera image; and
a coordinate modifying unit coupled to coefficient interpolation unit for calculating modified texture coordinates in each camera image for each vertex according to the interpolated warping coefficient and its original texture coordinates in each camera image;
wherein each of the first vertex list and the second vertex list comprises a plurality of vertices with their data structures that define a vertex mapping between the camera images and the panoramic image; and
wherein the n number of warping coefficients respectively denote warping degrees for n number of overlap regions in the panoramic image and n>=1.

9. The system according to claim 8, wherein if n=1, the interpolated warping coefficient is equal to the single warping coefficient.

10. The system according to claim 8, wherein if n>=2, the coefficient interpolation unit generates the interpolated warping coefficient for each camera image in relation to a target vertex by performing interpolation operations over warping coefficients of a plurality of adjacent overlap regions with respect to the original texture coordinates of the target vertex in each camera image.

11. The system according to claim 10, wherein when the number of adjacent overlap regions is equal to two, the coefficient interpolation unit calculates the interpolated warping coefficient for a specified camera image according to the following equation:

$$C'=C2*\theta1/(\theta1+\theta2)+C1*\theta2/(\theta1+\theta2); \text{ and}$$

wherein C' denotes the interpolated warping coefficient, C1 denotes a first warping coefficient of a first overlap region from the two adjacent overlap regions, C2 denotes a second warping coefficient of a second overlap region from the two adjacent overlap regions, $\theta1$ denotes a first angle between a first vector from the center of the specified camera image to the location of the first overlap region and a second vector from the center of the specified camera image to the target vertex, and $\theta2$ denotes a second angle between the second vector and a third vector from the center of the specified camera image to the location of the second overlap region.

12. The system according to claim 8, wherein the coordinate modifying unit calculates the modified texture coordinates of a target vertex for a specified camera image according to the following equation:

$$U1'=(U1-U_{center})*C'+U_{center}; V1'=(V1-V_{center})*C'+V_{center};$$

wherein (U1', V1') denotes the modified texture coordinates of the target vertex, (U1, V1) denotes the original texture coordinates of the target vertex, C' denotes the interpolated warping coefficient, and ($U_{center}$, $V_{center}$) denotes texture coordinates of the center of the specified camera image.

13. The system according to claim 8, wherein the optimizing unit further uses an optimization algorithm to modify the n number of warping coefficients so as to minimize the n number of region errors.

14. The system according to claim 8, wherein the image processing apparatus operates in at least a mix mode and comprises:
a rasterization engine for receiving a group of vertices forming a polygon from the second vertex list, performing polygon rasterization operations for a target point within the polygon to generate at most two pairs of texture coordinates and at most two face blending weights for at most two camera images, and sending destination coordinates of the target point if N is greater than one;
a texture mapping circuit for generating at most two sample values for the target point by texture mapping texture data from the at most two camera images according to the at most two pairs of texture coordinates;
a blending unit coupled to the texture mapping module for blending the at most two sample values according to the at most two face blending weights to generate a blended value;
a destination buffer coupled to the blending unit for storing the blended value as a portion of the panoramic image; and
a measuring unit coupled between the rasterization engine and the texture mapping module for receiving the destination coordinates of the target point to determine which overlap region the target point belongs to, and accumulating the difference between the two sample values as the region error for a specified overlap region if the target point belongs to the specified overlap region;
wherein N denotes a number of overlapping camera images contained in the data structures for the group of vertices.

15. The system according to claim 14, wherein the texture mapping circuit comprises:

a first texture mapping engine having a first output terminal that carries one of the two sample values and is coupled to first input terminals of the measuring unit and the blending unit; and a second mapping engine having a second output terminal that carries the other of the two sample values and is coupled to second input terminals of the measuring unit and the blending unit.

16. The system according to claim 14, wherein the texture mapping module comprises a single texture mapping engine having an output terminal that carries one of the two sample values and is coupled to first input terminals of the measuring unit and the blending unit, and the destination buffer has an output terminal coupled to both second input terminals of the blending unit and the measuring unit, and wherein the measuring unit accumulates the difference between the two sample values from its first and second input terminals as the region error.

17. The system according to claim 16, wherein each of the first vertex list and the second vertex list is a surface vertex list, and wherein the destination buffer outputs one of the two sample values in response to the destination coordinates of the target point from the single texture mapping engine.

18. The system according to claim 8, wherein the image processing apparatus operates in at least a test mode and comprises:
a rasterization engine for receiving a group of vertices forming a polygon from the second vertex list, performing polygon rasterization operations for a target point within the polygon to generate at most two pairs of texture coordinates for at most two camera images, and sending destination coordinates of the target point if N is greater than one;
a texture mapping circuit for generating at most two sample values for the target point by texture mapping texture data from the at most two camera images according to the at most two pairs of texture coordinates; and
a measuring unit coupled between the rasterization engine and the texture mapping module for receiving the destination coordinates of the target point to determine which overlap region the target point belongs to, and accumulating the difference between the two sample values as the region error for a specified overlap region if the target point belongs to the specified overlap region;
wherein N denotes a number of overlapping camera images contained in the data structures for the group of vertices.

19. A vertex processing method applied in an image processing system having an image capture module that generates a plurality of camera images, the method comprising the steps of:
obtaining an interpolated warping coefficient for each camera image with respect to each vertex from a vertex list based on n number of warping coefficients and its original texture coordinates in each camera image; and
calculating modified texture coordinates in each camera image for each vertex according to the interpolated warping coefficient and its original texture coordinates in each camera image;
wherein the vertex list comprises a plurality of vertices with their data structures that define a vertex mapping between the camera images and a panoramic image; and wherein the n number of warping coefficients respectively denote warping degrees for n number of overlap regions in the panoramic image and $n \geq 1$.

20. The method according to claim 19, wherein if n=1, the interpolated warping coefficient is equal to the single warping coefficient.

21. The method according to claim 19, wherein the step of obtaining further comprises:
when $n \geq 2$, calculating the interpolated warping coefficient for each camera image in relation to a target vertex by performing interpolation operations over warping coefficients of a plurality of adjacent overlap regions with respect to the original texture coordinates of the target vertex in each camera image.

22. The method according to claim 21, wherein the step of obtaining further comprises:
when the number of adjacent overlap regions is equal to two, calculating the interpolated warping coefficient for a specified camera image according to the following equation:

$$C' = C2 * \theta1/(\theta1+\theta2) + C1 * \theta2/(\theta1+\theta2); \text{ and}$$

wherein C' denotes the interpolated warping coefficient, C1 denotes a first warping coefficient of a first overlap region from the two adjacent overlap regions, C2 denotes a second warping coefficient of a second overlap region from the two adjacent overlap regions, $\theta1$ denotes a first angle between a first vector from the center of the specified camera image to the location of the first overlap region and a second vector from the center of the specified camera image to the target vertex, and $\theta2$ denotes a second angle between the second vector and a third vector from the center of the specified camera image to the location of the second overlap region.

23. The method according to claim 19, wherein the step of calculating the modified texture coordinates coordination further comprises:
calculating the modified texture coordinates of a target vertex for a specified camera image according to the following equation:

$$U1' = (U1 - U_{center}) * C' + U_{center}; V1' = (V1 - V_{center}) * C' + V_{center};$$

wherein (U1', V1') denotes the modified texture coordinates of the target vertex, (U1, V1) denotes the original texture coordinates of the target vertex, C' denotes the interpolated warping coefficient, and ($U_{center}$, $V_{center}$) denotes texture coordinates of the center of the specified camera image.

24. The method according to claim 23, wherein after the specified camera image is mapped to the panoramic image, an expansion image effect is created if C'<1, and a shrink image effect is created wherein if C'>1.

25. The method according to claim 19, wherein the vertex list is one of an original vertex list and an original surface vertex list from a calibration device, and wherein the original vertex list is divided into a plurality of original surface vertex lists.

26. An image processing method for receiving a first vertex list from a calibration device and generating a panoramic image, comprising:
modifying all the texture coordinates for all vertices from the first vertex list based on n number of warping coefficients to generate a second vertex list;
selectively forming the panoramic image according to a plurality of camera images from an image capture module and the second vertex list;

measuring n number of region errors for n number of overlap regions in the panoramic image; and obtaining the n number of warping coefficients according to the n number of region errors;

wherein the step of modifying comprises:

obtaining an interpolated warping coefficient for each camera image with respect to each vertex from the first vertex list based on the n number of warping coefficients and its original texture coordinates in each camera image; and calculating modified texture coordinates in each camera image for each vertex according to the interpolated warping coefficient and its original texture coordinates in each camera image;

wherein each of the first vertex list and the second vertex list comprises a plurality of vertices with their data structures that define a vertex mapping between the camera images and the panoramic image; and wherein the n number of warping coefficients respectively denote warping degrees for n number of overlap regions in the panoramic image and n>=1.

27. The method according to claim 26, wherein the step of obtaining the n number of warping coefficients further comprises:

using an optimization algorithm to modify the n number of warping coefficients so as to minimize the n number of region errors.

28. The method according to claim 26, wherein when the image processing method operates in at least a mix mode, the step of selectively forming the panoramic image comprises:

receiving a group of vertices forming a polygon from the second vertex list;

performing polygon rasterization operations for a target point within the polygon to generate at most two pairs of texture coordinates and at most two face blending weights for at most two camera images;

sending destination coordinates of the target point if N is greater than one;

obtaining at most two sample values for the target point by texture mapping texture data from the at most two camera images according to the at most two pairs of texture coordinates;

blending the at most two sample values according to the at most two face blending weights to generate a blended value for the target point; and storing the blended value as a portion of the panoramic image by a destination buffer;

wherein N denotes a number of overlapping camera images contained in the data structures for the group of vertices.

29. The method according to claim 28, wherein the step of measuring the n number of region errors comprises:

receiving the destination coordinates of the target point to determine which overlap region the target point belongs to; and when the target point belongs to a specified overlap region, accumulating the difference between the two sample values as the region error for the specified overlap region.

30. The method according to claim 28, wherein the step of blending further comprises:

when only a first sample value of the two sample values for the target point is received, directly storing the first sample value in the destination buffer;

when a second sample value of the two sample values is received, fetching the first sample value from the destination buffer; and blending the two sample values according to the two face blending weights to generate the blended value.

31. The method according to claim 30, wherein each of the first vertex list and the second vertex list is a surface vertex list, and wherein the step of fetching further comprises:

fetching the first sample value from the destination buffer in response to the destination coordinates of the target point.

32. The method according to claim 26, wherein when the image processing method operates in at least a test mode, the step of selectively forming the panoramic image comprises:

receiving a group of vertices forming a polygon from the second vertex list;

performing polygon rasterization operations for a target point within the polygon to generate at most two pairs of texture coordinates for at most two camera images;

sending destination coordinates of the target point if N is greater than one; and obtaining at most two sample values for the target point by texture mapping texture data from the at most two camera images according to the at most two pairs of texture coordinates;

wherein N denotes a number of overlapping camera images contained in the data structures for the group of vertices.

33. The method according to claim 32, wherein the step of measuring the n number of region errors comprises:

receiving the destination coordinates of the target point to determine which overlap region the target point belongs to; and when the target point belongs to a specified overlap region, accumulating the difference between the two sample values as the region error for the specified overlap region.

34. The method according to claim 26, wherein if n=1, the interpolated warping coefficient is equal to the single warping coefficient.

35. The method according to claim 26, wherein the step of obtaining further comprises:

when n>=2, calculating the interpolated warping coefficient for each camera image in relation to a target vertex by performing interpolation operations over warping coefficients of a plurality of adjacent overlap regions with respect to the original texture coordinates of the target vertex in each camera image.

36. The method according to claim 35, wherein the step of obtaining further comprises:

when the number of adjacent overlap regions is equal to two, calculating the interpolated warping coefficient for a specified camera image according to the following equation:

$$C' = C2*\theta1/(\theta1+\theta2) + C1*\theta2/(\theta1+\theta2); \text{ and}$$

wherein C' denotes the interpolated warping coefficient, C1 denotes a first warping coefficient of a first overlap region from the two adjacent overlap regions, C2 denotes a second warping coefficient of a second overlap region from the two adjacent overlap regions, θ1 denotes a first angle between a first vector from the center of the specified camera image to the location of the first overlap region and a second vector from the center of the specified camera image to the target vertex, and θ2 denotes a second angle between the second vector and a third vector from the center of the specified camera image to the location of the second overlap region.

37. The method according to claim 26, wherein the step of calculating the modified texture coordinates coordination further comprises:

calculating the modified texture coordinates of a target vertex for a specified camera image according to the following equation:

$$U1'=(U1-U_{center})*C'+U_{center}; V1'=(V1-V_{center})*C'+V_{center};$$

wherein (U1', V1') denotes the modified texture coordinates of the target vertex, (U1, V1) denotes the original texture coordinates of the target vertex, C' denotes the interpolated warping coefficient, and ($U_{center}$, $V_{center}$) denotes texture coordinates of the center of the specified camera image.

38. The method according to claim 26, wherein the first vertex list is one of an original vertex list and an original surface vertex list, and wherein the original vertex list is divided into a plurality of original surface vertex lists.

* * * * *